(12) United States Patent
Holt

(10) Patent No.: US 12,475,098 B2
(45) Date of Patent: Nov. 18, 2025

(54) MEMETIC DATABASE

(71) Applicant: Holtwork LLC, Incline Village, NV (US)

(72) Inventor: Brian Holt, Incline Village, NV (US)

(73) Assignee: Holtwork LLC, Incline Village, NV (US)

( * ) Notice: Subject to any disclaimer, the term of this patent is extended or adjusted under 35 U.S.C. 154(b) by 0 days.

(21) Appl. No.: 18/814,486

(22) Filed: Aug. 24, 2024

(65) Prior Publication Data

US 2025/0068615 A1   Feb. 27, 2025

Related U.S. Application Data

(60) Provisional application No. 63/534,798, filed on Aug. 25, 2023.

(51) Int. Cl.
*G06F 16/22* (2019.01)
(52) U.S. Cl.
CPC ................. *G06F 16/2282* (2019.01)
(58) Field of Classification Search
CPC .................................. G06F 16/2282
USPC .................................. 707/715, 716
See application file for complete search history.

(56) References Cited

U.S. PATENT DOCUMENTS

| | | | |
|---|---|---|---|
| 8,548,758 B1 * | 10/2013 | Foley .............. | G06Q 50/08 702/50 |
| 10,817,576 B1 * | 10/2020 | Davidovich ........ | G06F 3/0484 |
| 10,853,062 B1 | 12/2020 | Holt | |
| 11,409,521 B2 | 8/2022 | Holt | |
| 2006/0282429 A1 | 12/2006 | Hernandez-Sherrington et al. | |
| 2013/0232143 A1 | 9/2013 | Ait-Mokhtar | |
| 2016/0110121 A1 | 4/2016 | Singh et al. | |
| 2018/0046638 A1 * | 2/2018 | Qiu ............ | G06F 3/067 |
| 2020/0110818 A1 | 4/2020 | Garcia Guirado | |

FOREIGN PATENT DOCUMENTS

WO   WO20250493350   3/2025

OTHER PUBLICATIONS

International Search Report for PCT Application PCT/US24/43763, mailed Dec. 16, 2024.
International Written Opinion for PCT Application PCT/US24/43763, mailed Dec. 16, 2024.

\* cited by examiner

*Primary Examiner* — Muluemebet Gurmu
(74) *Attorney, Agent, or Firm* — Clause Eight; Michael Catania

(57) ABSTRACT

An optimal method of storing, computing, and communicating knowledge is disclosed herein. The method of organizing computer information which allows for more flexible retrieval and manipulation using an ARB paradigm. This paradigm combines and extends elements of a graph database, row-column database, query language, declarative logic language, and functional programming language.

8 Claims, 19 Drawing Sheets

| ID | A | R | B |
|----|---|---|---|
| 1 | Orson Wells | actor | ROLE1 |
| 2 | Citizen Kane | movie | ROLE1 |
| 3 | Kane | character | ROLE1 |

FIG. 3

| ID | A | R | B |
|---|---|---|---|
| 7 | actor | COL | ROLE |
| 8 | movie | COL | ROLE |
| 9 | character | COL | ROLE |

| ID | TEMPLATE | POPULATED |
|---|---|---|
| actor | The actor $actor plays the character $character in the movie $movie. | The actor *Orson Wells* plays the character *Kane* in the movie *Citizen Kane*. |
| movie | The movie $movie stars {the actor $actor as the character $character}. | The movie *Citizen Kane* stars the actor *Orson Wells* as the character *Kane* and *Joseph Cotton* as *Jedediah Leland*. |
| character | The character $character is played by {the actor $actor in the movie $movie}. | The character *General Dreedal* is played by the actor *Orson Wells* in the movie *Catch-22 (1970)* and the actor *Peter Guinness* in *Catch-22 (2019)*. |

FIG. 5

```
NEW $STR
NAM $AID $RID $STR
NUL $LID
SET $AID $RID $BID ($QNT)
DEL $AID $RID $BID
```

FIG. 12

%AID %RID %BID

{ [ . ] [ARB] [1] }

FIG. 15

MEMETIC DATABASE

CROSS REFERENCES TO RELATED APPLICATIONS

The present application claims priority to U.S. Provisional Patent Application No. 63/534,798, filed on Aug. 25, 2023, which is hereby incorporated by reference.

STATEMENT REGARDING FEDERALLY SPONSORED RESEARCH OR DEVELOPMENT

Not Applicable

BACKGROUND OF THE INVENTION

Field of the Invention

A first aspect of the present invention relates to knowledge graphs, computer databases, relational databases, graph databases, no-SQL databases, and document search.

A second aspect of the present invention relates to artificial intelligence (AI), machine learning (ML), artificial neural networks (ANN), and Large Language Models (LLM).

A third aspect of the present invention relates to computer programming languages, formal logic, modal logic, type theory, database theory, graph theory, and metalanguages.

Description of the Related Art

Computer databases store vast amounts of information. The design of these databases determines the ease and ability of retrieving patterns of data from them. Relational databases use a row and column paradigm. Graph databases use a node-edge paradigm.

Type theory, set theory, graph theory, formal logic, and database theory are variously used to analyze data storage and processing on a computer.

BRIEF SUMMARY OF THE INVENTION

The present invention is an optimal method of storing, computing, and communicating knowledge. One aspect of the present invention involves a novel method of organizing computer information which allows for more flexible retrieval and manipulation using an ARB paradigm. This paradigm combines and extends elements of a graph database, row-column database, query language, declarative logic language, and functional programming language.

In one embodiment, the present invention improves the operations of a computing device by increasing the amount of significant information stored per unit of space on non-transitory computer-readable medium. In one embodiment, the present invention improves the operations of a computing device by increasing the amount of significant information manipulated per unit of time by a processor. In one embodiment, the present invention improves the operations of a computing device by reducing the amount of redundant, meta, and otherwise insignificant information stored/processed in the device.

In another embodiment, the present invention is used to train a large language model.

In another embodiment, the present invention is a component of a neural network.

In another embodiment, the present invention provides responses to queries made to virtual assistants or chatbots such as OPENAI's ChatGPT, APPLE's Siri, or AMAZON's Alexa.

In another embodiment, the present invention provides responses to search engine queries.

In another embodiment, the present invention stores business information, such as customer relationship management (CRM) data, and provides business intelligence responses and metrics.

In another embodiment, the present invention is used for inventory management and product assembly. A factory stores a number of components from suppliers. Each supplier's component is related to a component type. The component type is related to information necessary for the placement of that component with others in an assembly, such as size, weight, and connection elements. Factory robots access this information in order to correctly manipulate and build a given assembly. The present invention stores such information for a hierarchy of components for modular assembly. For example, a certain integrated circuit (IC) from a supplier is related by the present invention to an IC type specifying the number of pins and mounting type of surface-mount technology (SMT) or through-hole-technology (THT). A factory robot accesses those details and physically mounts that IC to a printed circuit board (PCB) accordingly. The assembled PCB board then considered a modular component that is related to a certain type in the present invention. The factory robot then accesses the details for this modular component type to connect the PCB to a 3D-printed plastic form using certain nuts and bolts at certain points. The robot continues to recursively assemble larger modules until the product is complete.

In another embodiment, the present invention is implemented on a blockchain. A given identifier is associated with permissions for one or more blockchain addresses to cryptographically sign messages which create, update, or delete information associated with that identifier. Messages are recorded by mining servers which authenticate, timestamp, and broadcast these messages. Optionally, the miners periodically group messages into blocks and cryptographically sign or hash these blocks. Optionally, multiple blockchains co-exist with certain identifiers only existing on a subset of the blockchains.

BRIEF DESCRIPTION OF THE DRAWINGS

FIG. 3 illustrates a column/row ARB data relationship.

FIG. 5 illustrates a human language template populated by ARB data.

FIG. 12 illustrates a command scheme for manipulating data.

FIG. 13 illustrates an ARB logic transcription.

FIG. 14 illustrates another ARB logic transcription.

FIG. 15 illustrates another ARB logic transcription.

DETAILED DESCRIPTION OF THE DRAWINGS

Those skilled in the art will recognize the included drawings provide only a few illustrative examples of possible embodiments of the present invention. It is to be understood that the scope of the present invention includes the many combinations, modifications, and embodiments that may be derived from these drawings. Elements of these drawings are conceptual representations of computer processes which those skilled in the art will recognize as a combination of computer software and hardware. Certain similar elements are given the same reference number across drawings, it is to be understood that aspects of these elements may differ somewhat according to the needs of the particular embodiment.

Figure 1:
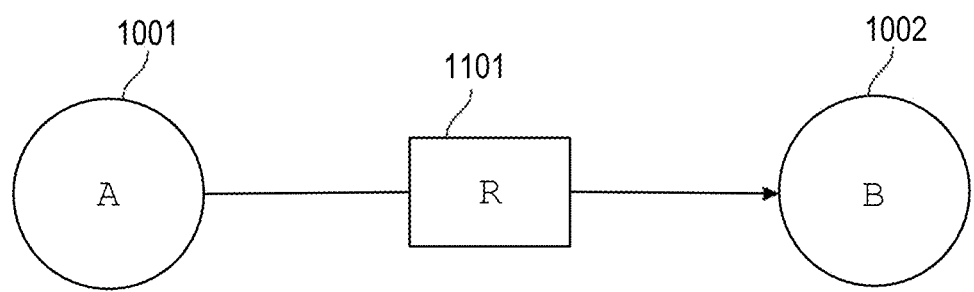
FIG. 1 illustrates a graphical ARB data relationship.

FIG. 1 illustrates a basic ARB meme. In this example, some element A 1001 has some relation R 1101 to some other element B 1002. In one embodiment, this graph is transcribed as (A R B). In one example, A 1001 represents Alice, R 1001 represents parent, and B 1002 represents Bob, which could be verbalized as "Alice is the parent of Bob." The A 1001 and B 1002 elements typically represent nouns such as people, places, things, ideas, and categories thereof. These elements may be proper nouns or common nouns. The same element may be used in an A 1001 or B 1002 position based on the specific R 1101. The R 1101 typically represents a verb or verb phrase such as "is the parent of" or "has headquarters at" or "is a kind of." The R 1101 has a specific direction such that the A 1001 and B 1002 are not necessarily swapable. Each ARB is logically unique such that no additional information is learnt from adding an identical ARB meme. Each ARB may be termed a meme or a triplet. In conventional computer terminology, an ARB may be termed specific form of row, or a specific form of a tuple.

Figure 2:
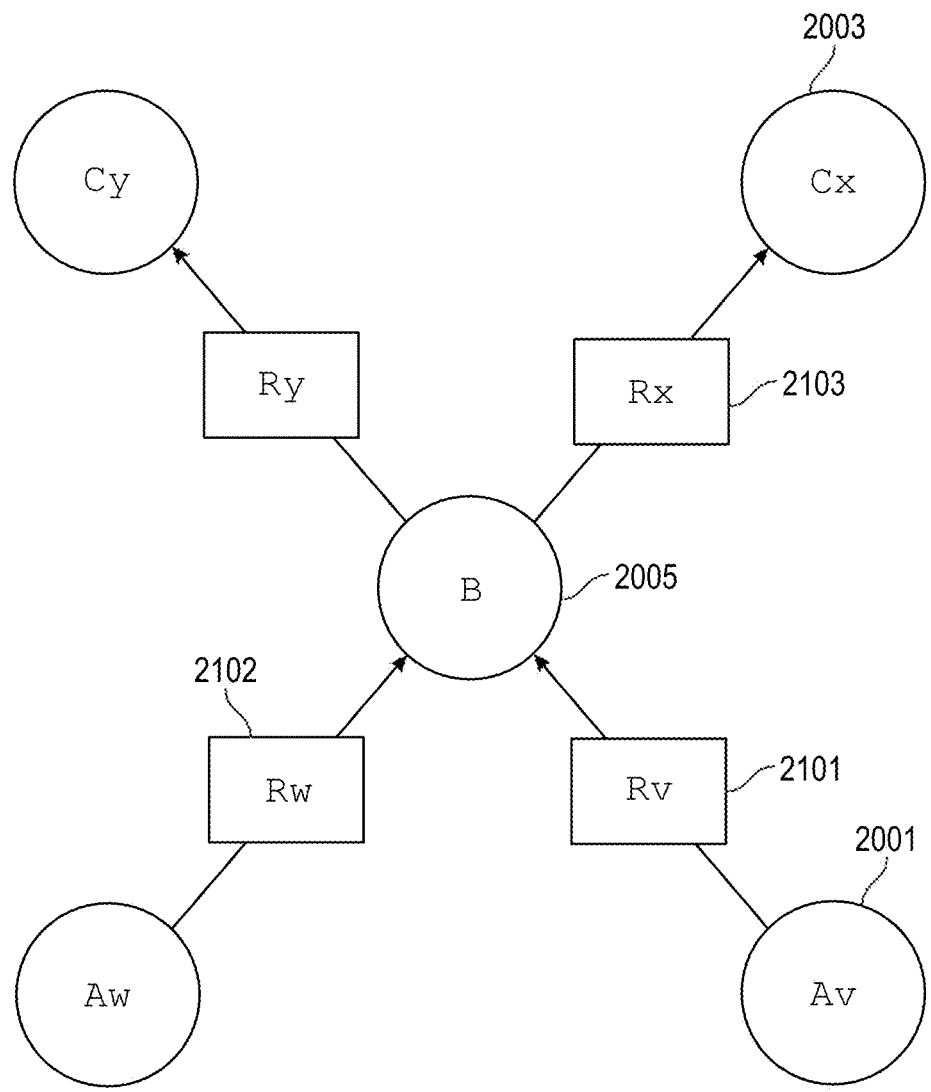
FIG. 2 illustrates a complex graphical ARB data relationship.

FIG. 2 shows a graphical representation of an ARB memeplex. In one embodiment, this graph is transcribed as (Av Rv B; Aw Rw B; B Ry Cy; B Rx Cx). In this example, Av 2001 is connected to B 2005 by an Rv 2101 relation. The B 2005 value is further connected to the Cx 2003 element through an Rx 2103 relation.

In one embodiment, the Rv value 2101 equals the Rw value 2102, indicating the same relationship. In another embodiment, the Rv value 2101 differs from the Rw value 2102, indicating the distinct relationships. Any given A value is optionally connected to one or many RB pairs. Any given B value is optionally connected to one or many AR pairs.

In one example, the Rx 2103 is verbalized as a phrase linking two sentences or clauses; for example, "as cited by" or "according to."

In a hierarchical embodiment, the B element represents one scale of information larger than the A elements. In this embodiment, A elements and B elements typically do not exist on the same hierarchical level of the graph. Likened to a graph database, the A element is analogous to a node and the B element is analogous to a graph. Likened to a relational database, the A element is analogous to a cell and the B element is analogous to a row. Likened to a neural network, the A element is analogous to a neuron and the B type is analogous to a network.

In one embodiment, an A element represents a letter or a group of letters (i.e. tokens), while a B element represents a word, name, or short phrase. In another embodiment, an A element represents a word, names, or short phrase, while a B element represents a sentence or clause. In another embodiment, an A values represents sentences and clauses, while a B element represents a long multi-clause sentence, multiple sentences, or a paragraph. In another embodiment, an A element represents a paragraph while a B element represents an article or page. In yet another embodiment, these levels are layered together, such that a B value represents a word, a C value represents a sentence, a D value represents a paragraph, and so forth. It is to be understood that the methods disclosed herein are applicable at many ARB scales and should not be limited to the given example scale.

In a heterarchical embodiment, there are no graph levels and there is no distinction between the scale of the A elements and B elements. This paradigm forms a graph/network structure.

In one embodiment, an ARB is associated with a sequence number (first, second, third, etc.) for display or execution purposes. In one embodiment, an ARB is associated with a weight value similar to a synapse weight in a neural network (e.g. a value between zero and one). The weight optionally indicates the strength of belief in the R relationship between that particular A and B.

FIG. 3 shows a column/row representation of an ARB data relationship. The data shown represents a sentence akin to "Orson Wells acts as the character Kane in the movie Citizen Kane." Collectively, these describe a movie role. The first column represents an identifier for each ARB. The second column represents an A value. The third column represents an R value. The fourth column represents a B value. Each ARB here has the same B value, indicating they are associated with the same role. The first ARB indicates that Orson Wells is the actor. The second ARB indicates that Citizen Kane is the movie. And the third ARB indicates that Kane is character.

In this example, the A, R, and B values are words for case of understanding. In an alternate embodiment, A, R, and B are identifiers which are associated with human language words stored elsewhere. The identifiers are optionally numeric or alphanumeric.

Embodied in SQL, the A, R, and B are optionally stored as integer identifiers in a table described as: CREATE TABLE 'ARB' ('A' BIGINT(20) UNSIGNED NOT NULL, 'R' BIGINT(20) UNSIGNED NOT NULL, 'B' BIGINT(20) UNSIGNED NOT NULL, UNIQUE KEY ('A', 'R', 'B'));

One SQL query for getting all ARBs for memes associated with one A value $AID from this table is: SELECT * FROM 'ARB' WHERE 'B' IN (SELECT 'B' FROM 'ARB' WHERE A=$AID);

In an alternate embodiment, the present invention uses a no-SQL database engine such as MongoDB, key-value store such as Redis, or wide-column database engine such as Cassandra. In an alternate embodiment, the present invention uses a purpose-built database engine. Ideally, a purposebuild database engine would be optimized for the specific data storage requirements and queries of the present invention.

Figures 4A, 4B:
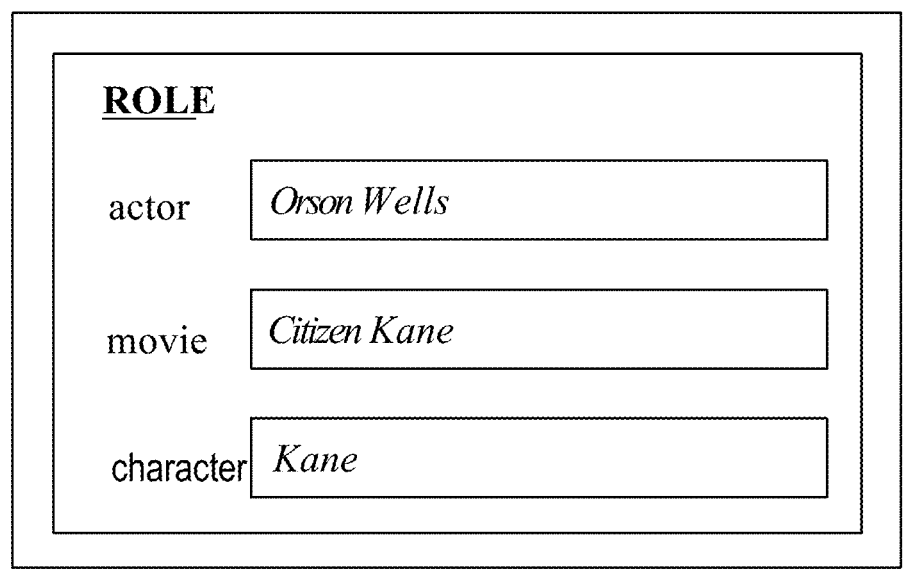
FIG. 4A illustrates a column/row representation of an ARB meta data.
FIG. 4B illustrates an input form based on the meta data in FIG. 4A.

FIG. 4A shows a column/row representation of an ARB meta data. Meta data describes how standard ARB data is inputted or outputted. This meta data forms a meta table with meta columns which is used in entering, displaying, and retrieving the data from FIG. 3. The A values in FIG. 4A correspond to the R values from FIG. 3. The R values here indicate a meta column relationship. And the B value of ROLE connects each column to one meta table. This meta data is optionally stored in the same database table (or equivalent) as the main data or it is optionally stored in a different database table.

FIG. 4B shows an entry form based on the meta data in FIG. 4A. In this example, a user enters the data that will populate FIG. 3. Optionally, new elements are given an incremental id number using a command such as SQL's LAST_INSERT_ID( ).

FIG. 5 shows a human language template populated by a meme's data. The first column shows an identifier. The second column shows a human language template. The template comprises variable signifiers associated with R values which will be populated with the paired A value from the meme. Typically, the variable signifier comprises an identifier associated with the R value and optionally one or more special characters; here they are formed as dollar sign and R name. The third column shows the template populated with meme data to form a sentence. The first row is a template verbalized from the perspective of one A value associated with the actor R value. The template is populated with meme data from FIG. 3 to form a sentence. The second row is a template verbalized from the perspective of one A value associated with the movie R value. Optionally, this template combines multiple memes from the same meta table (FIG. 4A) having the same A value paired with the movie R value. When combining memes into one sentence, the clause in curly brackets is repeated for each meme. In this case, the non-subject actor and character variables are in the curly brackets, and that clause is repeated twice in the sentence for the two character-actor AR pairs in the meme. It is to be understood that template formatting is arbitrary where characters such as the dollar sign or curly brackets may be replaced by other characters. Optionally, the templates are encoded in a markup language such as HTML or Markdown.

Figure 6:
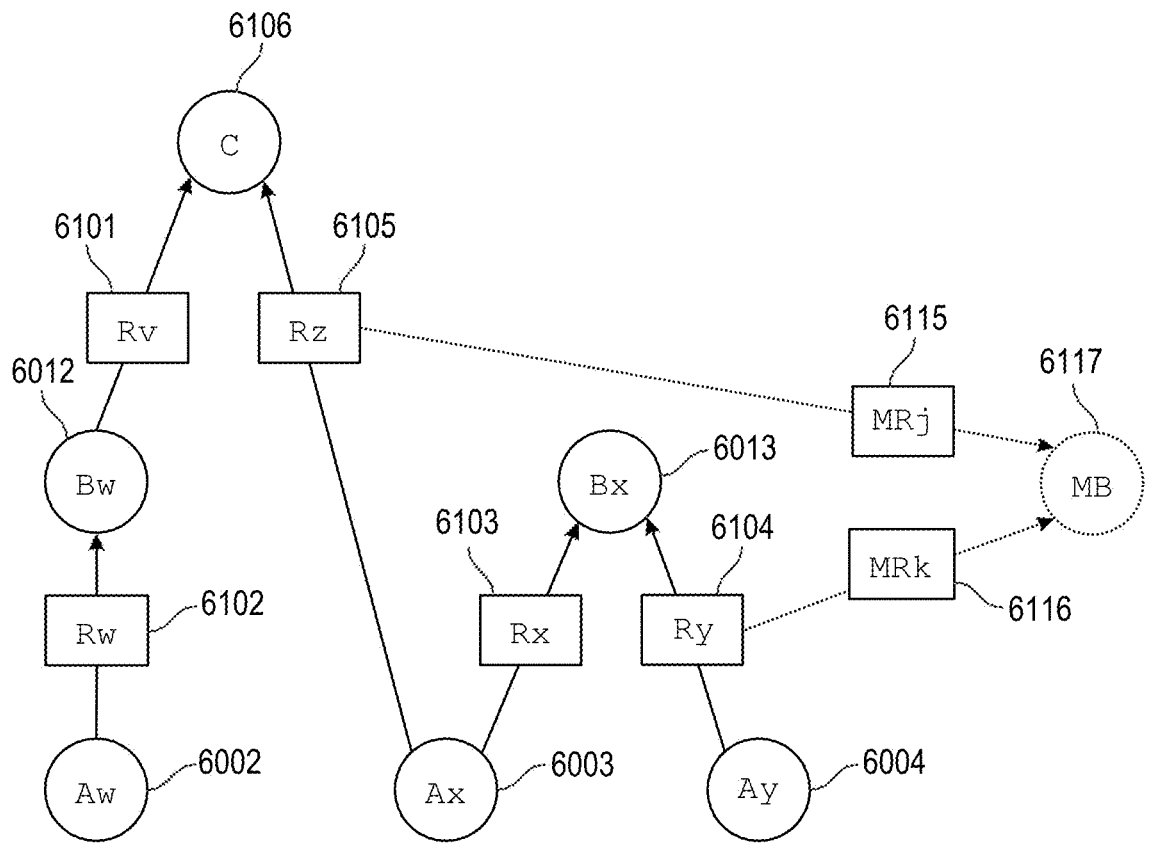
FIG. 6 illustrates a dynamic ARB relationship using meta relationships.

FIG. 6 shows graphical representation of a dynamic ARB relationship using meta relationships. This example dynamically creates a relation between the Ay 6004 and the C 6106 without previously having an ARB written to CRSM. This creates a logic pattern that can be reused. The Aw 6002 is related by Rw 6102 to Bw 6012. The Bw 6012 is related by Rv 6101 to C 6106. C 6106 is inversely related by Rz 6105 to Ax 6003. The Ax 6003 is related by Rx 6103 to Bx 6013. The Rz 6105 is also meta related by MRj 6115 to the meta MB 6117. The MB 6117 is related by MRk 6116 to Ry 6104. The graph is transcribed in one embodiment as (Aw Rw Bw; Bw Rv C; Ax Rz C; Ax Rx Bx; Ay Ry Bx; Rz MRj MB; Ry MRk MB).

Upon execution, the program searches for ARBs where the B type equals the C value 6106. One result ARB comprises Ax 6003, the Rz 6105, and C 6106. The program stores the Ax value 6003.

The program searches for meta ARBs (mARBs) where the A type equals the second Rz value 6105. One result mARB comprises Rz 6105, MRj 6115, and MB 6117. The program stores the MB value 6117.

The program searches for mARBs where the B type equals the MB value 6117. One result mARB comprises Ry 6104, MRk 6116, and MB 6117. The program stores the Ry value 6104.

The program searches for ARBs where A equals Ax 6003. One result ARB comprises Ax 6003, Rx 6103, and Bx 6103. The program stores the Bx value 6013.

The program searches for ARBs where the R type equals the third Ry value 6104 and the B type equals Bx 6013. This effectively searches for the unknown Ay value 6004 connected to the known Ry value 6104 and the known Bx value 60013. One result ARB comprises Ay 6004, Ry value 6104, and Bx 6103. The program stores the third Ay value 6004. Now the third Ay value 6004 can be used to inform the C 6106.

Here the term "stores" typically indicates reading the value from a slower CRSM and recording the value to a faster CRSM. For example, the program reads from an HDD and records to RAM. Or, for example, the program reads from RAM and records to the processor's cache. The term "search" indicates reading from a CRSM.

In certain embodiments, the ARB relationships are conceptualized as a hierarchy and mARB relationships are conceptualized as an intersecting perpendicular hierarchy.

In one embodiment, these meta relationships describe logical relationships such as family (e.g. parent, child, cousin) or group (e.g. kingdom, phylum, order, class, genus, species). This allows the program to search or display logically related information for a given element without having to permanently store logically redundant ARB relationships.

Figure 7:
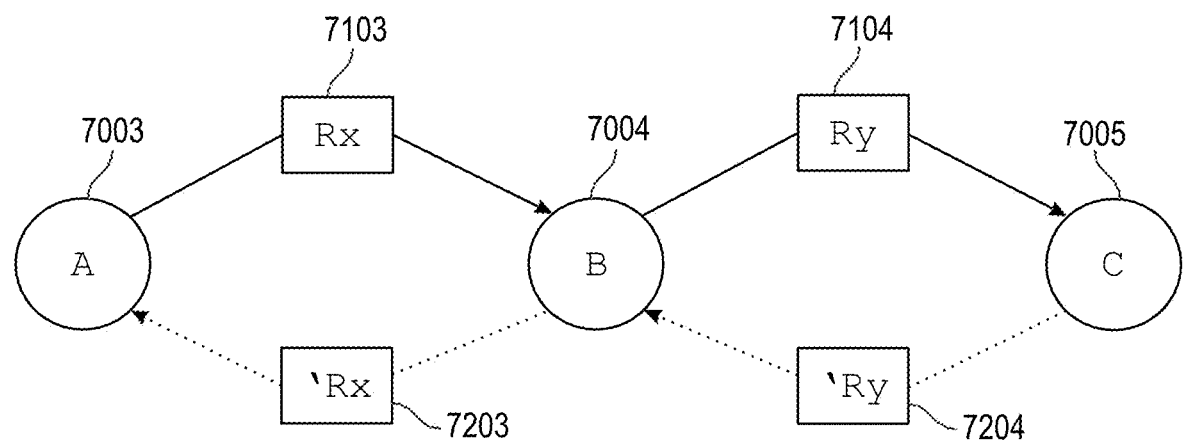
FIG. 7 illustrates an inverse ARB relationship.

FIG. 7 illustrates inverse relations in an ARB system. A first A 7003 is related to a B 7004 by Rx 7103. This implies an inverse relationship of B 7004 relating to A 7003 by 'Rx 7203. The 'Rx 7203 is the logical inverse of Rx 7103, for example parent-child/child-parent or movie-role/role-movie. The B 7004 is also related to C 7005 by Ry 7104 and an implied inverse 'Ry 7204. The implied relations are optionally written to a CRSM, or optionally programmatically derived from the explicit relationships.

In one embodiment, each relationship identifier number shares a mathematical relationship to its inverse relationship's identifier number. Optionally, the inverse relationship identifier number is plus or minus X of the relationship identifier number. Alternatively, the inverse relationship identifier number is multiplied or divided by X (where X may be negative) of the relationship identifier number. A mathematical relationship between relations allows the system to quickly calculate the inverse of any given relationship identifier. In one embodiment, a first relationship is given a lower even number identifier and its inverse relationship's identifier is one greater, giving it a higher odd number; thus an inverse relation can be calculated as:

$INVERSE=($RID %2)?($RID−1):($RID+1);

In one embodiment, a first user has permission to add an Rx 7103 relationship to the A 7003, but the system does not show the 'Rx 7203 relationship for the B 7004. This allows the first user to have permissions to modify data related to the A 7003 element, but not the B 7004 element. Optionally, a second user is permitted to add relationships to the B 7004 element, but not the A 7003 element. Optionally, the second user is presented with a message to accept or reject an 'Rx 7203 according to a Rx 7103. For example, the second user is presented with a message such as, "FirstUser has added this role to the movie Citizen Kane, would you like to add Citizen Kane as the movie in this role?"

In one graph theory interpretation of this paradigm, each A represents a node and each R represents an edge. Each unique R identifier represents a directed graph. And for each R identifier, there is a reverse directed graph 'R. The database as a whole represents a set of directed R graphs for a set of A nodes.

Figure 8:
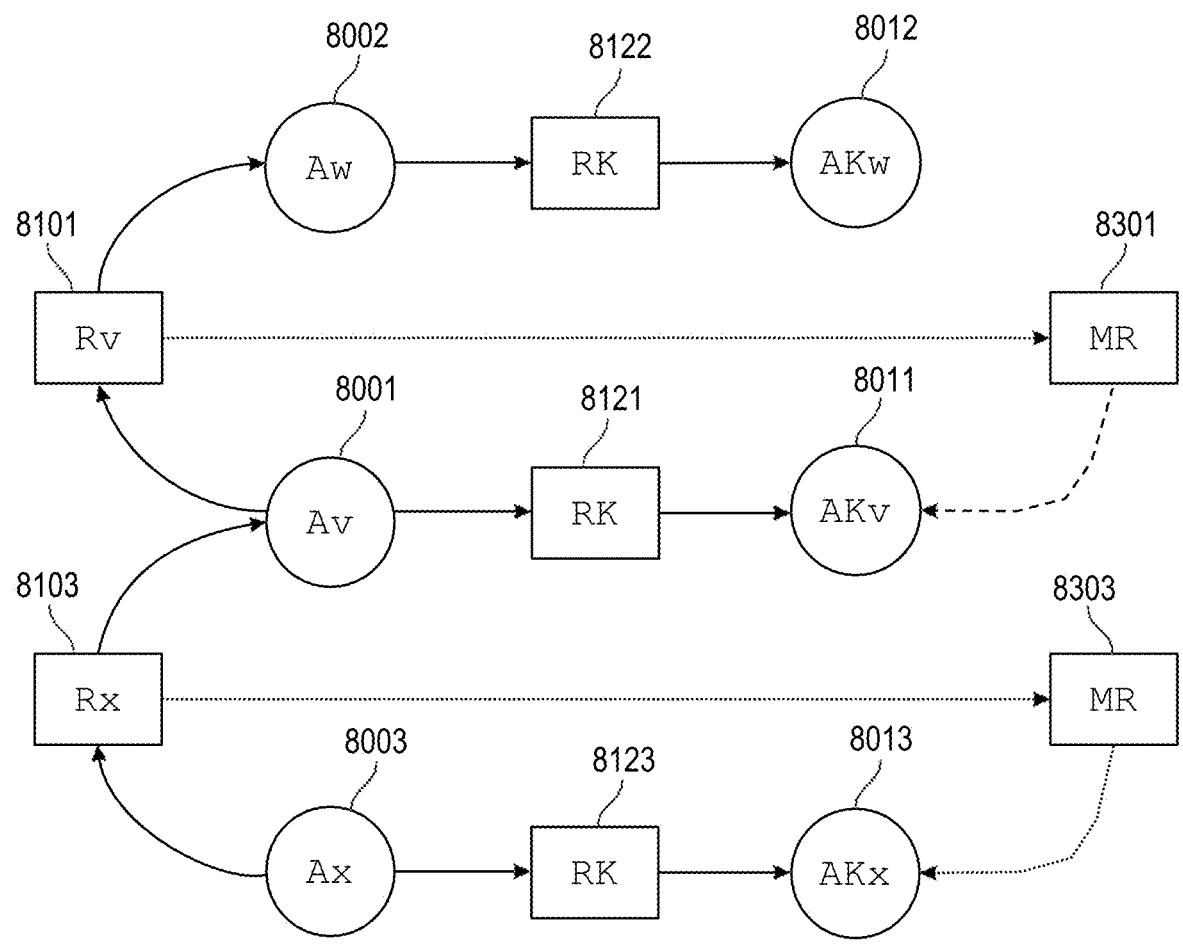
FIG. 8 illustrates business logic and meta relationships.

FIG. 8 illustrates an ARB paradigm with business logic using kinds and meta relationships. The Av 8001 is related to the Aw 8002 by Rv 8101. The Av 8001 is also inversely related to Ax 8003 by Rx 8103. The Av 8001 is also related to AKv 8011 by RK 8121. The Aw 8002 is also related to AKw 8012 by RK 8122. The Ax 8003 is also related to AKx 8013 by RK 8123. The Rv 8101 is related to the AKv 8011 by a first meta relationship MR 8301. The Rx 8103 is related to the AKx 8013 by a second meta relationship MR 8303. For clarity, this figure omits the implied inverse relationships. Here, AKv represents a specific type of A termed a kind and RK represents a specific relationship for designating kind. Here kind is akin to type or category or class, where analogous As are related to the same kind. In one embodiment, a kind is a common noun such as person, actor, movie, character, species, color, digital camera, retailer, verb, government agency, or company. For example, both Citizen Kane and Ferris Bueller's Day Off are both related to the kind movie. Optionally, one A is related it to multiple kinds. In one embodiment, each kind itself is an A related to a specified kind A with a specific identifier such as 123. In one embodiment, the RK has a specific identifier such as 456. Meta relationships (8301 and 8303) are used to enforce logic and data integrity. In one embodiment, the meta relationship allows/prevents an A of a certain kind to have certain relationships. For example, the meta relationship allows a "movie-role relation" to related to an A which is related to a movie kind, while preventing non-movies from having this relationship, through programmatic logic. Enforcing such selective relationships prevents erroneous relationships to be made.

Figure 9:
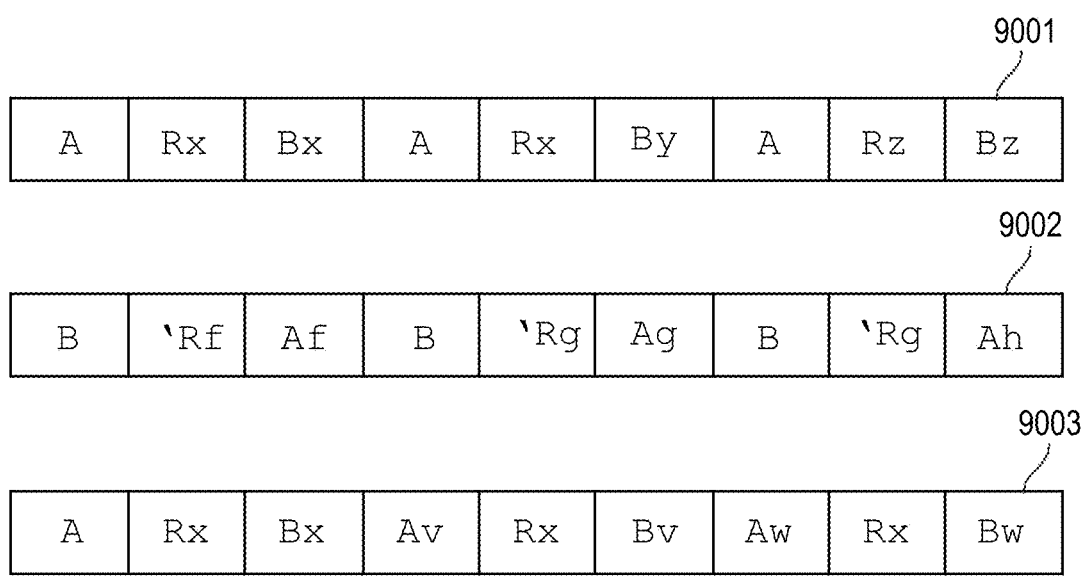
FIG. 9 illustrates a computer-readable storage medium (CRSM) efficiently storing ARB data.

FIG. 9 illustrates one embodiment of a computer-readable storage medium (CRSM) efficiently storing ARB data.

Block 9001 illustrates a CRSM storing ARB data grouped by A value. Each cell is a fixed length, for example, each cell is 8 bytes forming a 32 byte ARB row. The rows are stored sequentially on the medium without needing structuring data or dividers.

Block 9002 illustrates a CRSM storing ARB data grouped by B value. This is a duplicate set of data rearranged for the inverse relation such that the B values are in the A position. Upon manipulating the primary ARB meme, this duplicate meme is similarly manipulated. In one embodiment, Bs in 9002 are grouped with As of equivalent value in 9001.

Block 9003 illustrates a CRSM storing ARB data grouped by R value.

In one embodiment. rows are grouped by the indexed identifier prefix in Huffman coding. In another embodiment, row identifiers are indexed in a skiplist. In another embodiment, row identifiers are indexed using a hash index. In another embodiment, row identifiers are indexed using a B-tree or variant thereof. In another embodiment, row identifiers are indexed using an LSM tree. In another embodiment, rows are indexed and/or grouped using an R-tree. Optionally row placement on the CRSM corresponds to the index.

In one embodiment, rows are indexed to a definite A value such that writing the A value in each row is redundant, and thus the A cell is omitted for each row. In one embodiment, the set of rows where A=$AID are distributed across a plurality of groups and at least one group has empty rows to allow for new A=$AID memes to be quickly written without rearranging groups of data on the CRSM.

In one embodiment, the dataset is stored on multiple CRSMs connected by computer network.

Optionally, each row includes additional meta data such as a row identifier or a created/modified timestamp.

Optionally, each row includes as Q cell, which is optionally a floating-point number. In one embodiment Q=true is given a specific numeric value (such as 1 or 0.00001) so it may be stored in the same format at numeric Qs.

Groups may also be referred to as "pages" or "blocks" or "shards."

One embodiment is optimized for querying for all memes associated with one identifier $AID, analogous to the SQL query: SELECT * FROM 'ARB' WHERE 'A'=$AID OR 'B'=$AID;.

Figure 10:
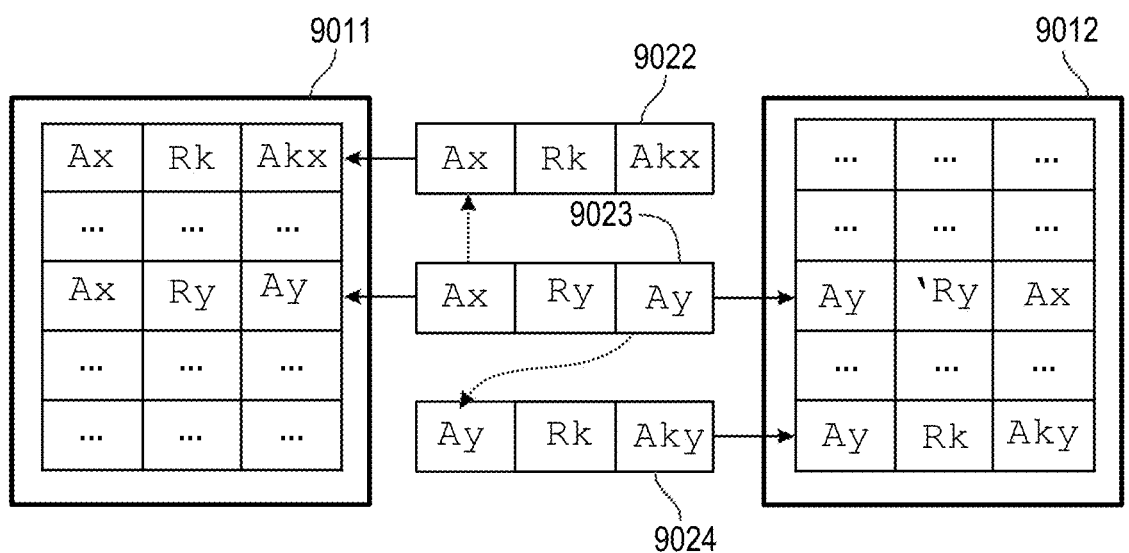
FIG. 10 illustrates ARB data sharded over multiple shards.

FIG. 10 illustrates one embodiment of ARB data sharding. A shard is a dataset written to at least one location on at least one computer-readable storage mediums (CRSM). Ideally, sharding data decreases read time and/or decreases the load on one CRSM. Optionally, multiple shards are stored on one CRSM. Optionally, one shard is stored on multiple CRSMs. The left column represents a first shard 9011. The right column represents a second shard 9012. The data in the center (9022, 9023, 9024) represents ARB data. At block 9022, a first row indicates Ax is related to a first kind Akx by relation Rk. At block 9023, a second row indicates Ax is related to Ay by relation Ry. At block 9024, a third row indicates the Ay is related to a kind Aky by relation Rk. Rows are assigned a shard by inputting the associated kind into a sharding function. The sharding function is a deterministic mathematic function that receives a large A identifier input and returns a smaller shard identifier output. Preferably, the number of possible sharding function outputs equals the number of shards in the system. Optionally the shard function comprises a hash function such as MD5 or SHA256, or optionally the shard function comprises an arithmetic function such as division or modulus. For example, the shard function performs a modulus 10 operation in order to select one of 10 possible shards; so an A identifier of 12345 would be assigned the shard identified by 5. The first row 9022 is directly related to kind Akx, and kind Akx is assigned to the first shard 9011. To assign a shard for the second row 9023, programmatic logic finds the kind associated with the A identifier Ax. The second row's 9023 A identifier equals the first row's A identifier, which is related to the kind Akx. Thus, the second row 9023 is also assigned to the first shard 9011. All data with the A identifier Ax is stored on one shard for optimal reading. This process is repeated for the B identifier so that all data for a given identifier (in the A and B position) is stored in one shard. Optionally, an ARB row is stored in an inverted form such as: the B identifier in the A position, the inverted R identifier in the R position, and the A identifier in the B position. In one embodiment, the ARB row and inverted ARB row are both stored, optionally on the same or different shards.

Figure 11:
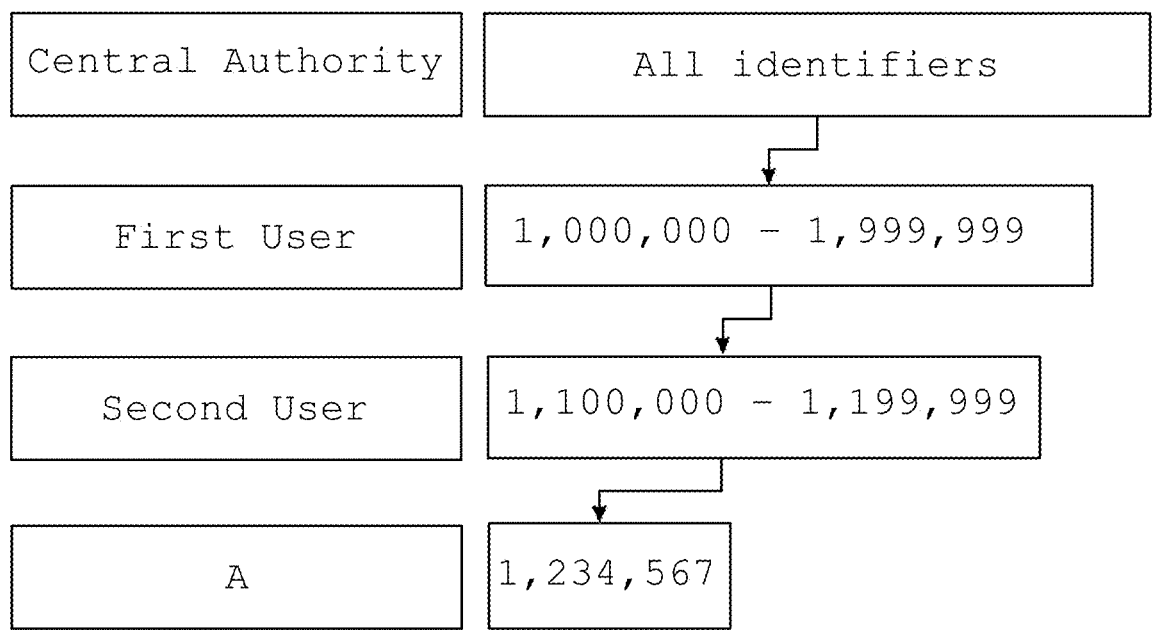
FIG. 11 illustrates an identifier assignment scheme.

FIG. 11 illustrates an identifier assignment scheme in a distributed embodiment. Typically, each A element has a unique identifier. To avoid identifier conflicts, wherein two users independently identify the same identifier to two distinct A elements, a central authority assigns identifiers to users. Users optionally subassign identifiers to other users. In one example, a first user sends a request to the central authority asking for one million identifiers; the central authority responds with a range of identifiers such as 1,000,000 through 1,999,999; the first user then subassigns the range 1,100,000 through 1,199,999 to a second user; the second user then identifies the identifier 1,234,567 to a given A element. In one embodiment, when a third user queries the central authority as to who owns the identifier 1,234,567, then the central authority replies with an indicator associated with the second user as the first user had previously notified the central authority of the subassignment. Alternatively, the central authority replies with an indicator associated with the first user, who when queried by the third user, replies with an indicator associated with the second user. In one embodiment, a record of identifier assignments is publicly available on a blockchain. Optionally, the central authority cryptographically signs a message assigning identifiers to a user's indicator. Optionally, the indicator is itself an identifier or is optionally a blockchain address. In one embodiment, the identifiers are requested and assigned via API calls to servers operated by the central authority. Optionally, the central authority assigns a sequential range of identifiers or optionally a single identifier. This scheme does allow for two different users to identify different identifiers to the same conceptual A element. While redundant, this prevents one user from adding unauthorized relationships to another user's data. Optionally, two different identifiers for the same conceptual A element are merged such that one identifier effectively replaces the other. Optionally, a new ARB is added wherein A is the unused identifier, R signifies a merger, and B is the used identifier; this relationship can be used to redirect requests from the unused identifier to the used identifier. The central authority keeps a record of identifiers assigned out and the user keeps a record of identifiers to which it was assigned.

Optionally, identifiers are assigned according to a modulus, for example a user is assigned identifiers where X>=ID % Z>=Y.

FIG. 12 represents one embodiment of API calls used for manipulating data. The exact embodiment of these commands is arbitrary. These commands are optionally formatted in JSON, YAML, HTTP query, REST, or other structured data formats. In one embodiment, these represent messages written to a blockchain.

NEW $STR
NAM @AID $RID $STR
NUL @AID $RID $STR
DAT @AID $RID $BID ($QNT)
DEL @AID $RID $BID

Here $STR represents a string name associated with an A. The $AID $RID and $BID are associated with an A, R, and B identifiers respectively. The NEW command selects and unused identifier for @AID, sets a string as the primary name for @AID, and outputs @AID. The NAM (add name) command associates additional string names with an @AID where the $RID describes the type of name (e.g. formal, informal, long, short, English, Japanese, etc.). The NUL (nullify name) command deletes a name. Alternatively, NAM returns a $LID identifier which is passed to NUL. The DAT (data) command adds an ARB relationship. The DEL command removes an ARB relationship. Further optional commands may be added for convenience, such as a command to wipe all data associated with an identifier, or a command to merge two identifiers by changing all values of a first identifier into a second identifier. Preferably, each @AID $RID $BID is unique as having duplicate ARB relationships typically does not provide additional information. Optionally, each ARB is given a $DID identifier. The optional $QNT value is a real number quantity of $BID when $BID represents a unit. For example, the @AID value represents light, the $RID value represents speed, the $BID value represents the unit meters per second and the $QNT value is 299792458.

FIG. 13 a illustrates one transcription of an ARB logic system. This transcription is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

| AID | RID | BID | QNT |
|---|---|---|---|
| USRF | KIND | USER | |
| USRF | BAL | UNIT | 123 |
| USRT | KIND | USER | |
| USRT | BAL | UNIT | 456 |
| TRN | KIND | TRNS | |
| TRN | UTO | USRT | |
| TRN | UFRM | USRF | |
| TRN | AMT | UNIT | 99 |
| %AID | KIND | TRNS | |
| @AID | AMT | UNIT | %AMT |
| @AID | UFRM | %USRF | |
| @USRF | BAL | UNIT | %BALF |
| @BALF | #EALB | @AMT | |
| @BALF | #LESS | @AMT | |
| @USRF | BAL | UNIT | @BALF |
| @AID | UTO | %USRT | |
| @USRT | BAL | UNIT | %BALT |
| @BALT | #MORE | @AMT | |
| @USRT | BAL | UNIT | @BALT |

Rows without no symbols or with only @ symbols store an ARB triplet, optionally short-term or long-term depending on the embodiment. Rows containing one or more % symbols read matching ARB triplets from storage and set the % variable to the read value(s) from that column, where the value may be one or more identifiers (typically for A, R, and B) or decimal numbers (typically for QNT). The value of a variable is later accessed by replacing the % with an @, so a variable set with % AMT is later read with @AMT. Rows containing # in the R column perform a math, logic, and/or programmatic function as named. Certain functions alter A according to QNT, for example #LESS performs subtraction as A-=QNT and #MORE performs addition as A+=QNT. Other functions perform a comparison of A and B and error if true/false; for example, #EALB (error if A less than B) evaluates A<B and errors if true.

The above code creates a TRN (transfer) where USRF (user-from) transfers 99 UNITs to USRT (user-to). The system checks that USRF has a BAL (balance) greater than the amount transferred. The system deducts the amount transferred from USRF's BAL and credits the amount transfers to USRT's BAL. For illustration, the logic is shown here below the TRNS, however typically the logic would be stored above the TRNS and triggered upon adding a new TRNS.

In another example:

| AID | RID | BID |
|---|---|---|
| BRAND | FLD | PROD |
| WDGT | KIND | PROD |

-continued

| AID | RID | BID |
|-----|-----|-----|
| WDGT | BRAND | MYCO |
| %AID | %RID | %BID |
| @AID | KIND | %KND |
| @RID | %FLD | @KND |
| @FLD | #EAXB | FLD |

This code enforces data typing such that only certain kinds can have certain relations. The first line defines BRAND (product brand) as a FLD (field) of PROD (product). The second line defines WDGT (widget) as a KIND of PROD. The third line sets WDGT's BRAND as MYCO. The next lines will enforce that AID=WDGT is appropriate for RID=BRAND. The fourth line matches any ARB and sets the % AID, % RID, and % BID variables accordingly. The fifth line looks up the KINDs related to @AID, and sets % KND as an array of matching identifiers. The sixth line looks up matching @RID, $FLD, @KND triples and sets % FLD to the RIDs. The seventh line errors if @FLD does not contain FLD. In this case, WDGT-BRAND-MYCO matches to WDGT-KND-PROD which matches to BRAND-FLD-PROD and therefore does not error.

The above logic expressed in pseudocode:

```
list($AID, $RID, $BID) = get(*, *, *);
$KND = search($AID, KIND, *);
foreach ($KND as $kid) {
  $FLD = get($RID, *, $kid);
  if ($FLD==FLD) return true;
}
exit('ERROR');
```

In one embodiment, the lines containing logic are stored as ARB triplets with specific kinds indicating their functions.

In one embodiment, this technique is used in a Hyperpiler (U.S. Pat. No. 10,942,709) wherein the ARB data comprises the specification entities and the logic comprises the ruleset. Optionally, Hyperpiler segments are stored as strings associated with identifiers.

In certain embodiments, additional columns are added. In one embodiment, a column holds a number representing analogous to weight in a neural network. In another embodiment, a column further describes QNT such as equals, greater than, or less than.

In one embodiment, the $ @ symbols are omitted. Standard AID and BID identifiers are integers. The use of A-Z characters denotes a variable. The first use of a variable denotes "set" and later uses denote "read."

FIG. 14 Illustrates an alternate transcription of an ARB logic system. This transcription is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

[A R B Q/V] F [A R B Q/V] A query is wrapped in brackets. The first four terms are the query A, R, B, and Q values. Each of those values is optionally a wildcard character, such as a period. Missing ending terms are typically considered wildcards. The next term is the operator, wherein a forward slash indicates to output the value set by last term. The last term is the output term, which is A, R, B, or Q. The F is a function that compares or operates on the two queries. Comparison functions—such as equal to, greater than, less than, array comparisons, or similar—evaluate to true/false typically throw an error on false. Mathematical functions—including add, subtract, multiply, divide, and similar—modify the left query's Q according to the right query's Q. Further, a write function adds a new specified right query meme for each returned left query meme.

The system searches the data for memes matching the query and returns one or more values of the output term. The SQL equivalent of the query [A R B Q/V] is below. Typically, wildcard values would be omitted from the where clause. SELECT V FROM 'dat' WHERE aid=A AND rid=R AND bid=B AND qnt=Q;

In a special case, a query specifying only one term, which is also the output term, returns that term as a constant with no actual data querying necessary; for example [. . . 0/Q] returns zero. Typically, this is done for units or quantities.

Queries are optionally nested: [[A R . . /B] R B/B]

Here the internal query returns a B value which used as the A in the external query. Recurring use of the same nested query in one statement is optionally be treated as a variable, wherein the output value is stored in memory and does not need to be required for the same statement.

Similar rules to those described above are embodied in this format as:

```
[[[. KIND TRNS / A] USRF / B] BAL / Q] >= [[.
KIND TRNS / A] AMT / Q]
[[[. KIND TRNS / A] USRF / B] BAL / Q] - [[.
KIND TRNS / A] AMT / Q]
[[[. KIND TRNS / A] USRT / B] BAL / Q] + [[.
KIND TRNS / A] AMT / Q]
[. BAL / Q] >= [. . . 0 / Q]
[. BAL / B] = [. . UNIT / B]
[. KIND USER / A] W [[. KIND USER / A] BAL UNIT 0]
```

The first line requires that balance of the user-from in a transfer must be greater or equal to the user's balance. The second line decreases the user-from's balance. The third line increases the user-to's balance. The fourth line requires that a user's balance must be greater or equal to zero. The fifth requires the balance is denominated in UNITs. The sixth line creates a balance of zero for a user upon the creation of that user.

FIG. 15 Illustrates an alternate one transcription of an ARB logic system. This transcription is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

Memes specify relations between elements.

[A R B] A meme stating that some A has some relation R to some B.

[A R B Q] The property R of some A is Q quantity of B units. Q is default NULL or a specified real number.

[[A1=w] [R1=x] [B1=y] [Q1=z]] Alternate syntax.

Sets contain memes.

[A R.] The set of memes having some A with some relation R to any B. Dot and undefined are wildcards.

[... (>0)] The set of memes having a quantity greater than zero.

Sequences manipulate sets of memes.

{[Ax Rx Bx Qx] [Ay Ry By Qy]} Sequence. A "for each" loop is applied to each set, left to right. Ends on empty set.

{[. . . .] [A1 R1 B1 Q1] [A2 R2 B2 Q2]} Left values populate numbered variables to the right.

{[. . . .] [A . . .] [A . . .]} An unnumbered variable is populated from previous set.

{(A1=w) (R1=x) (B1=y) (Q1>=z) (A2=B1)} Alternate syntax. Variables are automatically grouped into queries.

{[. . . .] [B1 'R1) A1 Q1]} Every relation has an implied inverse relation ('R).

{[.balance.] [.recipient A1] [A2 amount.] [A1 R1 B1 (+Q3)]} Example of accumulating transactions into a balance.

{[+R 'New element'] [A1 . .]} Create a new named element, return the element's ID.

{Rx Ry Rz}={[.Rx.] [B Ry.] [A1 Rz B2]} The left term is an abbreviation for the defined "logic box."

Commands interact with sets

{[. . . . >]} Output all memes in the set (default).

{[. . . . 0]} The set must contain zero memes, or error.

{[. . . . 1]} The set must contain exactly one meme, or error.

{[. . . . 2]} The set must contain at least one meme, or error.

{[. . . . <]} Write all memes in the set.

{[. . . . !]} Delete/falsify all memes in the set.

{[. . . . +]} Sum all Q's in the set.

{[. . . . *]} Multiply all Q's in the set.

{[. . . . @]} Count memes in set.

{[. . . .] [@]} Alternate syntax.

Unities compare sequences.

<<{X} {Y} {Z}>>Given the first sequence, all following sequences are equivalent. An empty first sequence means always equivalent. Equivalent sequences are listed by preference.

<<{ } {[.]} {[. .]} {[. . .]} {[. . . .]} {[.] [.]}>>Dots are equivalate to undefined <<{[W∈R] [X∈R]} {[W+X]} {[X+W]}>>Commutative property of addition <<{[X!=L] [Y!=M] [Z!=N]} {[X Y Z]} {[L M N] [X Y Z]}>>Non-sequitur terms Special relations.

<<{[Rx=('Rx)]} {Rx Rx} {[.Rx.] [B1 Rx A1]}>>Rx is mutual.

{Rx Ry ('Ry)}Rx is a sibling relation with respect to Ry.

One sequence optionally comprises a breadth-first search (BFS). BFS is an algorithm for searching a tree data structure for a node that satisfies a given property. It starts at the tree root and explores all nodes at the present depth prior to moving on to the nodes at the next depth level.

Another sequence optionally comprises a depth-first search (DFS). DFS is an algorithm for traversing or searching tree or graph data structures. The algorithm starts at the root node (selecting some arbitrary node as the root node in the case of a graph) and explores as far as possible along each branch before backtracking.

Figure 16:
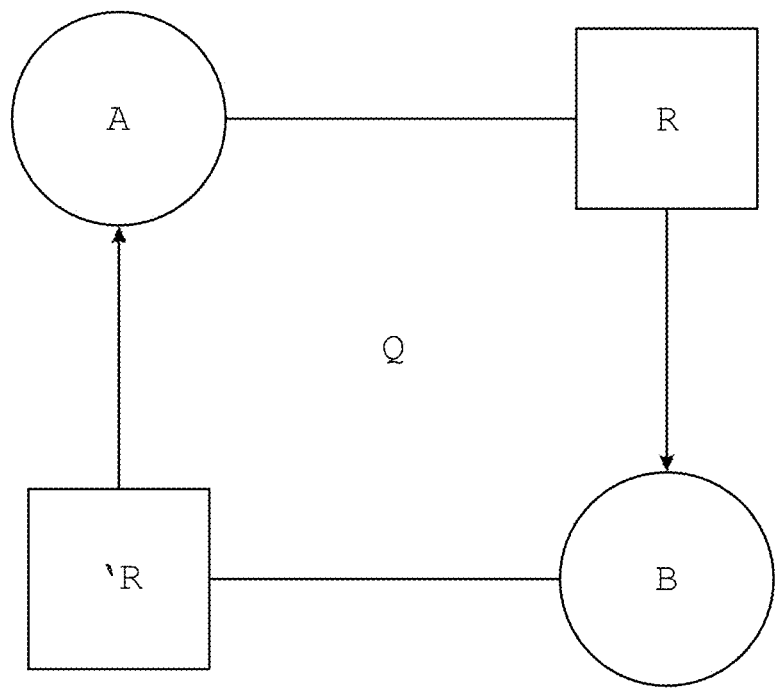
FIG. 16 illustrates another ARB logic transcription.

FIG. 16 Illustrates an alternate transcription of an ARB logic system. This transcription is optionally interpreted by a computer program, executed as a scripting language, transcoded into a programming language, or compiled as executable code. This format optionally expresses meta relationships described above. Those skilled in the art will recognize this code may be embodied in many equivalent forms and the form below is but one illustrative embodiment. Further, those skilled in the art will recognize the precise machine execution of this code will vary from system to system and may be optimized for various factors.

(R(A,B)=Q) This is a memetic relation in conventional notation. A function R takes two identifiers as inputs and outputs null, false, true, or a real number.

Q:={null, false, true, real number}.

(R(A,B)=null) Relation is unknown.

(R(A,B)=true) A is known to be related by R to B.

(R(A,B)=false) A is known NOT to be related by R to B.

(R(A,B)=real number) The property R of A is the quantity Q of B units.

(R(A,B)='R(B,A)=Q) Every relation has an inverse relation 'R where the A and B identifiers are swapped.

(R(A,B)=A.R:B) This is memetic notation. It will be more convenient than conventional notation as we proceed.

(B'R:A=Q) Memetic notation for an inverse relation.

(kind(alice,user)=true==alice.kind: user=true==alice.kind:user==alice kind user==user 'kind alice) Example meme stating that Alice is a kind of user. For simple statements, the punctuation is assumed.

(balance(alice,usd)=99==alice.balance:usd=99==alice balance usd 99==usd 'balance alice 99) Example meme with a numeric quantity stating that Alice has a balance of $99.

(Ax.Rx:Bx>Qx & Ax.Ry:By>Qy @cnt?=0) Each expression in the statement has a special function. Certain expressions return sets and forward arrays, where the array is one place value from each set (e.g. every A from the set). In one embodiment, an expression causes data to be read from a lower-speed CRSM and an array of sets and/or an array of values to be written to a higher speed CRSM according to the context in a memetic statement.

(A) If specified, retrieves the set of all memes with this A. If omitted, the starting set is the set of all memes. Forwards an array comprising the As. Only used at the start of a statement. A set of memes all having the same A value is termed an A-set.

(.R) Retrieves the set of all memes with this R and an A equal to any value from the previous forwarded array. Forwards an array comprising the Bs. The output set may be larger than the input set.

('R) Retrieves the set of all memes with this R and an B equal to any value from the previous forwarded array. Forwards an array comprising the As. The output set may be larger than the input set.

(:B) Filters the previous set to only those memes with this B. Forwards an array of Qs. Only used at the end of a statement. A set of memes all having the same B value is termed an B-set.

(?=, >, <, >=, <=, !=) Quantity operators filter the previous set to only those memes with satisfying Qs.

(+, −, *, /) Arithmetic operators receive the array of Qs by default.

(+=, −=, *=, /=) Arithmetic-update operators receive the array of Qs by default and update the Q value in the respective meme.

(&) The conjunction set operator merges two sets into one set where every A appears in both sets. Memes with As in only one set are excluded. It is optionally processed in parallel on a computing device.

(|) The disjunction set operator merges all memes from two sets into one set. The (;) semicolon defaults to (|) behavior in appropriate cases. It is optionally processed in parallel on a computing device.

(~) The non-conjunction operator merges two sets into one set where every A appears in only one set, but not both. It is effectively both XOR and NAND. It is optionally processed in parallel on a computing device.

(@cnt) The counter operator counts the number of memes in the previous set. The counter operator may be paired with a quantity operator such as (@cnt?=0), which emits an error if it evaluates to false. Likewise, @min, @max, @avg, @sum, @prod perform their respective aggregate functions.

((A.Rx|A.Ry)==A.Rx,Ry) A disjunction of two relations on one A returns a set with both relations and is equivalent to SELECT Rx, Ry in SQL. This sequence is simplified to a comma for brevity. It is optionally processed in parallel on a computing device.

(alice.parent.brother:bob=true) Rs may be chained. Here, Alice has some unnamed parent who has a brother Bob.

(bob.'brother.'parent:alice=true) or (bob'brother'parent: alice=true) Inverted Rs chain A-A or B-B or A-B. The dot is assumed before an apostrophe.

(.uncle==.parent.brother) An relation may be defined as a chain of other relations.

('uncle=='brother'parent) The inverse of a chain is the relations inversed and reversed.

(.brother==(.sibling & B̲.gender:male)) A relation between A and B may imply a tangential relation to a C. Here, .brother implies that the B is male. B̲ is underlined to signify the literal letter B is used in the definition.

('brother==('sibling & male'gender:A̲)==(.sibling & A̲.gender:male)==(.sibling & .gender:male)) When A̲ or B̲ is used in the definition, the inverse is further "abversed" to swap the defined A̲ and B̲. Typically, A̲ is omittable from the definition.

(.speed:mps==.distance:m/.time:s) A relation may be defined as a mathematical operation between other relations. Here, for A where A.distance:m is a number and A.time:s is a number, create a new meme A.speed:mps equal to the quotient of the numbers of other two memes.

(camera'kind.price*=0.8) Here, all camera price quantities in all units are reduced by 20%.

(alice kind user; alice balance usd 99; user'kind.balance: usd<0 @cnt?=0) Here, a user's balance cannot fall below zero.

(.kind:camera &!.kind:phone & (.price: usd<1000|.resolution:megapixels>20)) Here, the query finds a set where each meme belongs to a camera, or a phone, but not an item that is both camera and phone, that is priced less than $1000 or has more than 20 megapixel resolution. For each satisfying A, the output set includes the A.kind, A.price:usd, and A.resolution memes.

(Af==(Af.Rx:Bx=Qx & Af.Ry:By=Qy & . . . )) An identifier is defined as the conjunction of all relations.

((Ag<=Af)==(Ag.Rx:Bx=Qx & Ag.Ry:By=Qy & . . . )) The analog operator that applies the relations from the statement on the right to the statement on the left. Here Ag receives all of Af's relations.

((Ag=!Q<=Af)==(Ag.Rx:Bx=!Qx & Ag.Ry:By=!Qy & . . . )) Here, the (!Q) on the right applies "not" to all Q's in Af's relations, making Ag is the opposite of Af.

(Ag:Bg<=Af:Bf) Here, all relations between Af and Bf are applied between Ag and Bg.

(.hypotenuse:num==(.xcoord:num^2+.ycoord:num^2) ^0.5; alice.xcoord:num=5; alice.ycoord:num=10; bob.xcoord:num=17; bob.ycoord:num=120; ((distance<=alice)-= bob).hypotenuse) Here, an example of a relation calculating the distance between two objects.

($hypotenuse==(.first:A̲ & .second:B̲ & .length:num== ((A̲.xcoord−B̲.xcoord)^2+(A̲.ycoord−B̲.ycoord)^2)^0.5); (alice|bob)$hypotenuse; alice$hypotenuse:bob)) The matrix operator takes a set of disjunctive A-sets and performs the described relations on each permutation. The resulting new temporary memes are given A identifiers distinguishing them as temporary; for example, permanent identifiers are positive and temporary identifiers are negative. If the program instructs the device to permanently store the temporary memes, then the temporary identifiers are swapped for permanent identifiers. Here, an example of a process calculating the distance between each A-set in the disjunctive A-sets of Alice and Bob.

(A::B) Does a search for all relations between A and B. Optionally, depth is limited. Optionally, performs depth first search, breadth first search, variant, or combination thereof.

(bob.human.bob=true) Relations are optionally reflexive. Reflexive relations are inherently symmetrical. This reads, "Bob is a human."

(A.is:B=A.B @cnt>0) The existential relation is true/false if A has any B relation. Note that the B transposes to the R position on the right.

Figure 17:
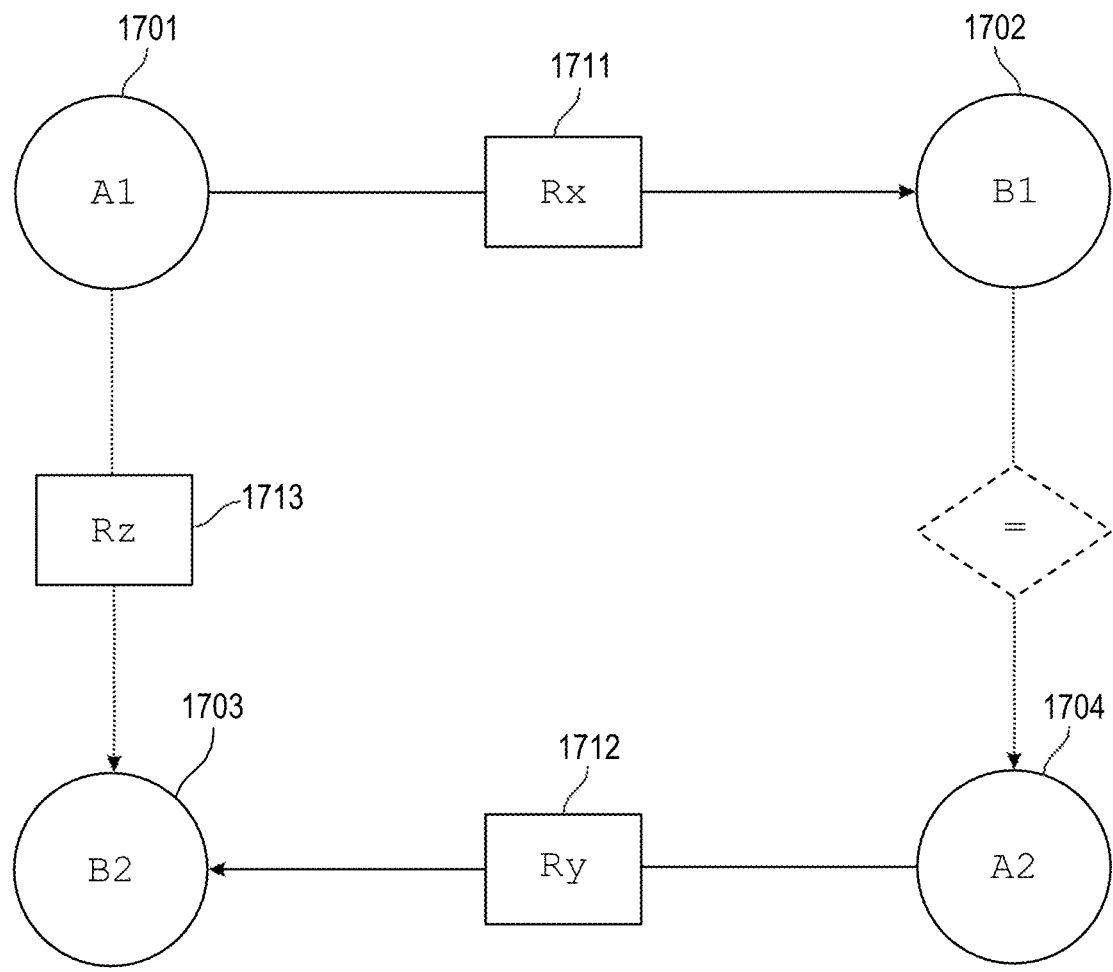
FIG. 17 illustrates a logic box.

FIG. 17 Illustrates a logic box. The logic box sequence comprises three R values: Rx 1711, Ry 1712, and Rz 1713. The data set comprises A1 1701 related by Rx 1711 to B1 1702; and A2 1703 related by Ry 1712 to B2 1704. The B1 1702 and A2 1704 have the same identifier value (B1=A2), representing the same idea. The logic box sequence finds a first set of memes related by Rx 1711, wherein a first meme in the first set comprises A1 1701, Rx 1711, and B1 1702. The logic box sequence then finds a second set of memes with an unknown B related by Ry 1712 to A2 1704, wherein B1=A2. The logic box sequence then creates a third set of memes, with one meme comprising A1 1701 related by Rz 1713 to B2 1703. Optionally, any of the A and B values are inverted by using an inverted R value ('R). In one embodiment, this is transcribed as {[.Rx.] [B1 Ry.] [A1 Rz B2]} or in shorthand {Rx Ry Rz}.

Figure 18:
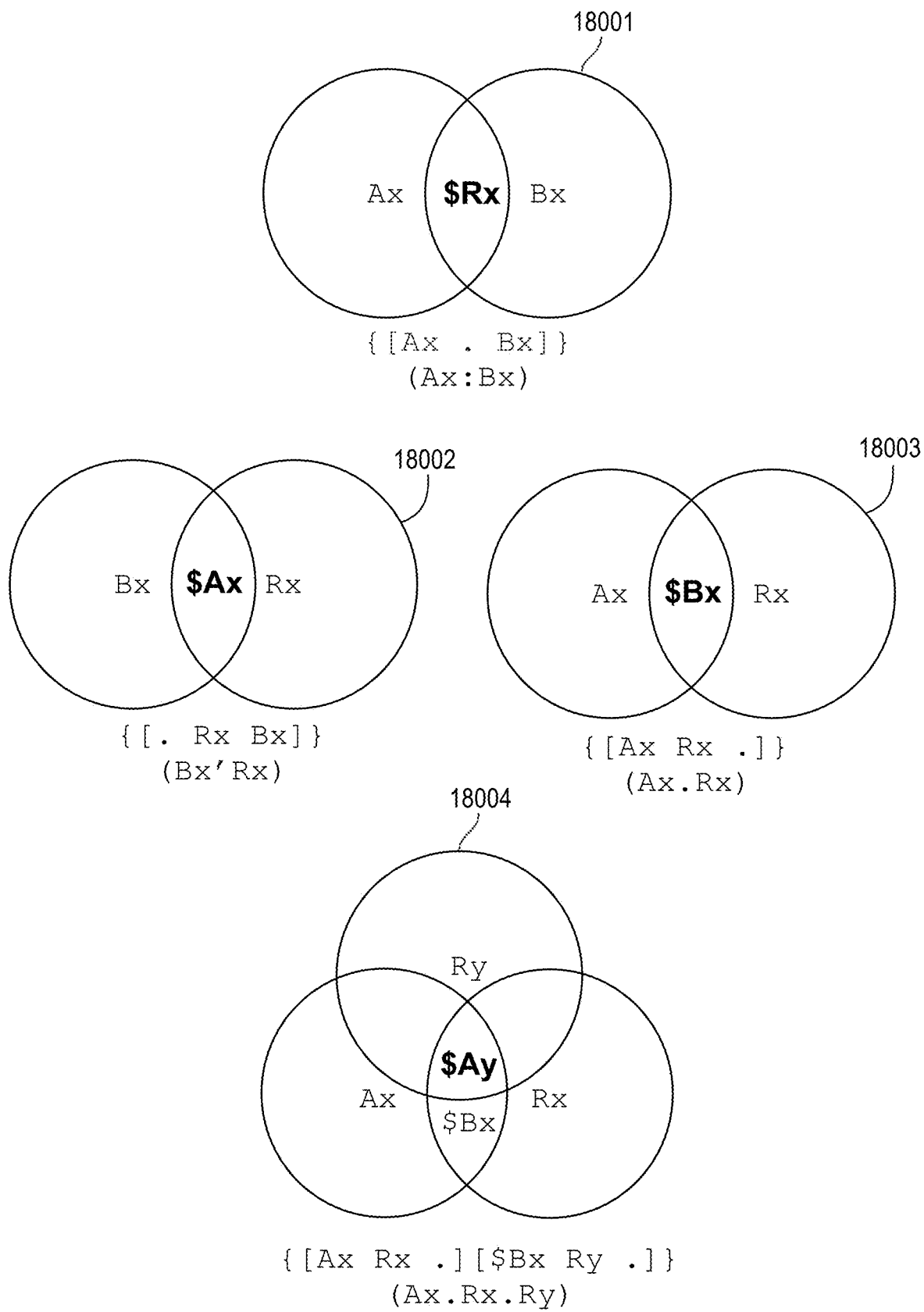
FIG. 18 Illustrates queries in terms of sets of As, Rs, and Bs.

FIG. 18 Illustrates queries in terms of sets of As, Rs, and Bs. Each query returns a set of memes, the figure illustrates the unknown place value which the query produces. At block 18001, a query with known A=Ax and B=Bx values produces a set with unknown R=$Rx values. At block 18002, a query with known B=Bx and R=Rx values produces a set with unknown A=$Ax values. At block 18003, a query with known A=Ax and R=Rx values produces a set with unknown B=Bx values. Queries are optionally chained as shown in block 18004, wherein a first query with a known A=Ax and R=Rx value produces unknown B=Bx values and those now-known Bx values are paired with a known R=Ry value to find a set with unknown A=$Ay values.

Figure 19A:
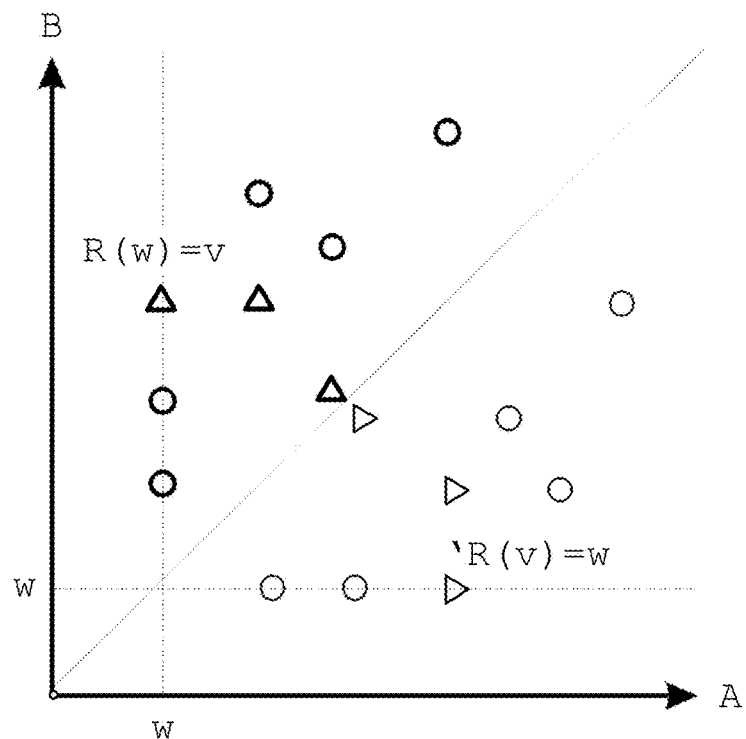
FIG. 19A Illustrates ARB relationships on a Cartesian plane.

FIG. 19A Illustrates an ARB scheme on a cartesian plane. The vertical axis represents the B identifier, the horizontal axis represents the A identifier. A first relation function R(A)=B is plotted with circles. A second relationship function Rt(A)=B is plotted with triangles. Bold shapes represent the original relationship, thin shapes represent inverse relationships 'R(A)=B and 'Rt(A)=B. The graph is semi-symmetric across the line A=B due to the inverse relations. A horizontal line for B=w and a vertical line for A=w is shown. All dots on a vertical or horizontal line share a logical relationship as they all relate to the same identifier. The relation functions are discontinuous. Here, each coordinate output for a relation function is termed a node.

In one embodiment, ARB data is stored on a CRSM in an (A,B) coordinate system where the cell at a given coordinate stores one or more R identifiers for the ARB relationship.

Figure 19B:
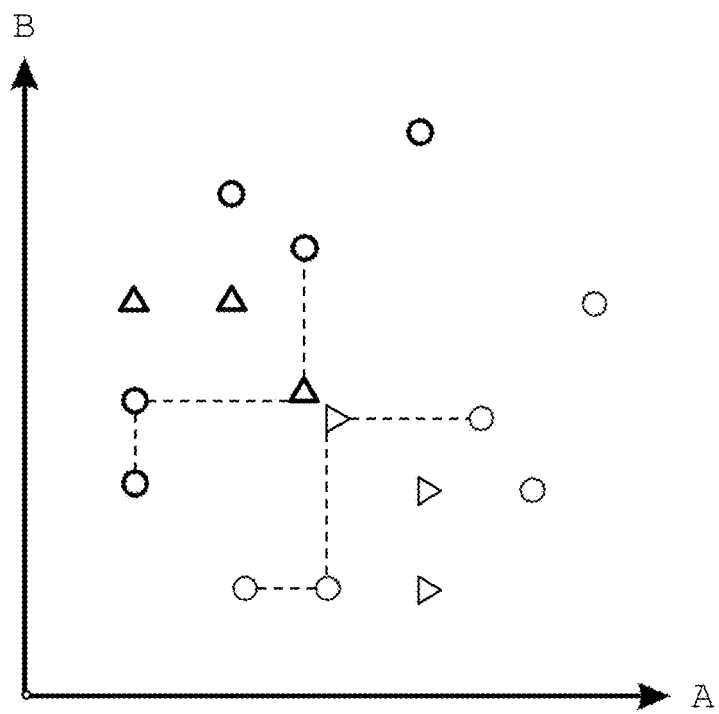
FIG. 19B Illustrates ARB relationships on a Cartesian plane.

FIG. 19B Illustrates a logical sequence on an ARB scheme on a cartesian plane. A logical sequence follows horizontal and vertical lines between nodes. Here, these lines are termed edges. In this example, the same logical sequence is drawn twice, once for the primary relationships and once for the inverse relationships. An efficient logical sequence alternates between horizontal and vertical movements. Two horizontal or two vertical edges in succession does not reveal new information.

A logical sequence may have a pseudo-diagonal edge by inverting a relationship. Such an inversion could be depicted with only vertical/horizontal edges and inverting the relationship does not change any logic or knowledge. However, in certain embodiments, it is useful to use an inverted relationship in storing sequences or retrieving data from a CRSM. A pseudo-diagonal edge that starts at (a,b) will end at either (b,x) or (x,a), where x may equal a or b, such that the ending coordinate shares at least one value from the starting coordinate on the opposing axis.

In the example graph shown, circles represent siblings and triangles represent parents. The edge traces an aunt/uncle relationship which can be verbalized as "my sibling's parent's sibling is my aunt/uncle."

Example Code

The Computer Program Listing Appendix submitted herewith is hereby incorporated by reference in its entirety. The Computer Program Listing Appendix is one prototype embodiment of the present invention. The attached embodiment is encoded in PHP and JavaScript and utilizes a MySQL or SQLite database. However, the present invention may be encoded in any number of computer programming languages may utilize any number of database programs. Those skilled in the art will recognize the present invention is preferably embodied in a purpose-written database program and the use of ready-made programs (such as MySQL) is for illustration and prototyping purposes.

Preferred Components of the Invention

The following describes some of the components variously used in certain embodiments of the present invention. Certain embodiments use additional components not listed here.

One embodiment of the present invention comprises an application programming interface or API. An application programming interface is a connection between computer programs wherein one program offers a known a service to another program. A program may offer an API locally to other programs on the same computer or a program may offer an API through a network interface.

One embodiment of the present invention comprises artificial intelligence or AI. Artificial intelligence is a computer program or model capable of intelligent behavior. Example AIs include GPT-3 by OpenAI, DALL-E by OpenAI, Stable Diffusion, MidJourney, and DeepMind by Alphabet.

One embodiment of the present invention comprises audio. Audio computer file formats include 3GP, AA, AAC, MP3 OGG, WAV, WMA, WEBM, and similar.

One embodiment of the present invention comprises Bitcoin or BTC. Bitcoin is a cryptocurrency protocol which implements a highly available, public, and decentralized ledger. In order to update the ledger, a user must prove they control an entry in the ledger.

One embodiment of the present invention comprises a blockchain. A blockchain is a list of records linked cryptographically and stored on a computer network. Constituent records are called blocks and typically comprise a cryptographic hash of the previous block and a timestamp. Example blockchains include Bitcoin, Ethereum, Polygon, Binance, Ripple, Cardano, Solana, Polkadot, Near, Avalanche, Litecoin, Monero, ARBitrum, Optimism, Lightning Network, and similar. Blockchains known as Layer-1 blockchains exists independently, blockchains known as Layer-2 are dependent on Layer-1 blockchains.

One embodiment of the present invention comprises a blockchain address. A blockchain address is a string associated with a public-private keypair for a user on a blockchain. Blockchain addresses are commonly represented as hexadecimal strings such as 0x1234ABC. Blockchain smart contracts are typically assigned a unique blockchain address to which users send messages to execute the program.

One embodiment of the present invention comprises a blockchain smart contract. A blockchain smart contract is a computer program that is automatically executed by nodes of a blockchain network. Example blockchains that utilize smart contracts include Ethereum and Solana.

One embodiment of the present invention comprises a blockchain token or coin or cryptocurrency. A blockchain token is a mathematical representation of asset ownership on a blockchain. Example Ethereum token types include ERC-20 fungible tokens, ERC-721 non-fungible tokens, and ERC-1155 semi-fungible tokens.

One embodiment of the present invention comprises CAD or computer-aided design. CAD is the use of computers to aid in the creation, modification, analysis, or optimization of a physical design. This software is used to increase the productivity of the designer, improve the quality of design, improve communications through documentation, and to create a database for manufacturing.

One embodiment of the present invention comprises cascading style sheets or CSS. Cascading style sheets is a style sheet language used for describing the presentation of a document written in a markup language such as HTML.

One embodiment of the present invention comprises a central bank digital currency or CBDC. A central bank digital currency is a digital liability of a central bank that is widely available to the general public. It can be considered a cryptocurrency backed by a central bank.

One embodiment of the present invention comprises a client or network client or computer client. A client is a computer initiating a request to a server computer over a network.

One embodiment of the present invention comprises clock signal or logic signal. In electronics and especially synchronous digital circuits, a clock signal is an electronic logic signal (voltage or current) which oscillates between a high and a low state at a constant frequency and is used like a metronome to synchronize actions of digital circuits. In a synchronous logic circuit, the most common type of digital circuit, the clock signal is applied to all storage devices, flip-flops and latches, and causes them all to change state simultaneously, preventing race conditions. A clock signal is produced by an electronic oscillator called a clock generator. The most common clock signal is in the form of a square wave with a 50% duty cycle. Circuits using the clock signal for synchronization may become active at either the rising edge, falling edge, or, in the case of double data rate, both in the rising and in the falling edges of the clock cycle.

One embodiment of the present invention comprises cloud computing. Cloud computing is the process of granting on-demand control of a computer to a user over a network.

One embodiment of the present invention comprises a cloud provider. A cloud provider is a legal person offering cloud computing. Example cloud providers include Amazon Web Services, Google Cloud, and Microsoft Azure.

One embodiment of the present invention comprises cloud storage. Cloud storage is the special case of cloud computing focused on offering on-demand storage and network transmission of data. An example of cloud storage is Amazon Web Service's Simple Storage Service (S3).

One embodiment of the present invention comprises a code generator. A code generator is a computer program that generates another computer program as output. The output program may be encoded in a programming language, assembly language, machine code, object code, byte code, or other binary code. An example code generator is the Hyperpiler disclosed in U.S. Pat. No. 10,942,709.

One embodiment of the present invention comprises a computer or computing device or computing system. A computer is a physical device comprising at least one computer-readable storage medium and at least one processor. A computer operates by reading input data from a computer-readable storage medium, reading instructions from a computer readable storage medium, and executing the input data and instructions with the processor to produce output data. Output data is typically stored in a computer-readable storage medium and/or outputted to a user. Computer form factors include desktops, laptops, smart phones, smart watches, and servers.

One embodiment of the present invention comprises a computer network or network. A computer network is two or more computers comminating. Network data may be sent as electric pulses over copper wire, light pulses over optical fiber, and/or radio waves over the air.

One embodiment of the present invention comprises computer vision. Computer vision tasks include methods for acquiring, processing, analyzing and understanding digital images, and extraction of high-dimensional data from the real world in order to produce numerical or symbolic information, e.g. in the forms of decisions.

One embodiment of the present invention comprises a computer-readable storage medium or computer data storage medium or CRSM or storage. A computer-readable storage medium is a physical device containing input data and/or instructions for use by a computer. Common CRSMs include hard drives (HDD), solid state drives (SSD), flash drives, tape drives, magnetic tape, Compact Discs (CD), Digital Video Discs (DVD), Blue-rays, optical drives, floppy disks, zip drives, random access memory (RAM), read only memory (ROM), and punch cards.

One embodiment of the present invention comprises a convolutional neural network or ConvNet or CNN. A convolutional neural network is a class of artificial neural network (ANN), most commonly applied to analyze visual imagery.

One embodiment of the present invention comprises a copyright. A copyright is a type of intellectual property that gives its owner the exclusive right to copy, distribute, adapt, display, and perform a creative work, usually for a limited time. The creative work may be in a literary, artistic, educational, or musical form. Copyright is intended to protect the original expression of an idea in the form of a creative work, but not the idea itself. A copyright is subject to limitations based on public interest considerations, such as the fair use doctrine in the United States.

One embodiment of the present invention comprises CRUD or create/read/update/delete or manipulate. CRUD are the four basic operations on stored data. In SQL, these terms typically correspond to INSERT, SELECT, UPDATE, and DELETE. In HTTP, these terms typically correspond to POST, GET, PUT, DELETE.

One embodiment of the present invention comprises cryptography. Cryptography is the practice and study of techniques for secure communication in the presence of adversarial behavior. In computer science, common cryptographic techniques include Diffie-Hellman, X.509, Rivest-Shamir-Adleman (RSA), and Elliptic-curve cryptography (ECC), and Elliptic Curve Digital Signature Algorithm (ECDSA).

One embodiment of the present invention comprises data compression. Data compression is the process of encoding information using fewer bits than the original representation. Compression can be lossless, which preserves all original information, or lossy, which inexactly represent the original information. Example compression algorithms include JPEG, MPEG, PNG, H.264, and ZIP.

One embodiment of the present invention comprises a database or data base or DB or computer database. A database is an organized set of data stored on a computer-readable storage medium for manipulation by a database program.

One embodiment of the present invention comprises database cell or cell. Database cell is the value of one row at one column in a database table.

One embodiment of the present invention comprises a database column or column. A database column is a set of values of a particular type, with each row having one value per column in a table.

One embodiment of the present invention comprises a database management system or DBMS or database program or database software. A database management system is a special case program to manipulate a database. Example database management systems include MySQL, Microsoft Access, SQLite, PostgreSQL, MariaDB, Couchbase, Redis, MongoDB, and HBase.

One embodiment of the present invention comprises a database right. A database right is a sui generis property right, comparable to but distinct from copyright, that exists to recognize the investment that is made in compiling a database, even when this does not involve the creative aspect that is reflected by copyright. Such rights are often referred to in the plural: database rights. The Agreement on Trade-Related Aspects of Intellectual Property Rights (TRIPS) Agreement requires that copyright protection extends to databases and other compilations if they constitute intellectual creation by virtue of the selection or arrangement of their contents, even if some or all of the contents do not themselves constitute materials protected by copyright.

One embodiment of the present invention comprises a database row or row or tuple. A database row is an entry in a database table comprising one value per column of the table.

One embodiment of the present invention comprises database table or table. Database table is One embodiment of the present invention comprises a domain name. A domain name is an identification string that defines a realm of administrative authority within the Internet. Domain names are used in various networking contexts and for application-specific naming and addressing purposes. Generally, a domain name points to a server at a given IP address.

One embodiment of the present invention comprises a download. A download is the transmission of data from a server computer to a client computer over a network.

One embodiment of the present invention comprises the EIP or Ethereum improvement proposal. The EIP is a prefix for Ethereum standards, followed by a number, such as EIP-165.

One embodiment of the present invention comprises the ERC or Ethereum request for comments. The ERC is a prefix for Ethereum standards, followed by a number, such as ERC-20.

One embodiment of the present invention comprises the ERC-1155. The ERC-1155 is a free, open standard that describes how to build semi-fungible or unique tokens on the Ethereum blockchain.

One embodiment of the present invention comprises the ERC-20. The ERC-20 is a free, open standard that describes how to build fungible tokens on the Ethereum blockchain.

One embodiment of the present invention comprises the ERC-721. The ERC-721 is a free, open standard that describes how to build non-fungible or unique tokens on the Ethereum blockchain.

One embodiment of the present invention comprises Ethereum. Ethereum is a blockchain network with smart contract functionality developed in 2014 by Vitalik Buterin and others.

One embodiment of the present invention comprises Ethernet. Ethernet is a family of wired computer networking technologies commonly used in local area networks (LAN), metropolitan area networks (MAN) and wide area networks (WAN).

One embodiment of the present invention comprises hardware or computer hardware. Hardware is the collection of physical devices comprising a computer.

One embodiment of the present invention comprises a hash function or hash. A hash function is a function that converts input data of ARBitrary size to an output value of fixed size. Hashes are often used in checksums, check digits, fingerprints, lossy compression, randomization functions, error-correcting codes, and ciphers. Hashes may be implemented by software, hardware, or both. Example hash functions include Secure Hash Algorithm 2 (SHA2), Message-Digest Algorithm 5 (MD5), and cyclic redundancy check 32 (CRC32).

One embodiment of the present invention comprises HTML or HyperText Markup Language. HTML is the standard markup language for displaying documents in a web browser.

One embodiment of the present invention comprises a HTTP cookie or cookie. A HTTP cookie is a piece of data stored on a client computer used for storing state information when communicating with a server. Typically, cookies are handled by web browsers.

One embodiment of the present invention comprises an IDE or integrated development environment. An IDE is a software application that provides comprehensive facilities to computer programmers for software development, typically consisting of a source code editor, build automation tools, and a debugger.

One embodiment of the present invention comprises an input device. An input device is a physical device which initiates a computer execution. Such execution includes storing data, storing instructions, and/or selecting instructions and data to execute in the future. Input devices include computer keyboards, keypads, computer mice, touch screens, microphones, cameras, card readers, scanners, bar code readers, chip readers, magnetic tape readers, network modem (wired or wireless), and Bluetooth receiver.

One embodiment of the present invention comprises the Internet. The Internet is the global system of interconnected computer networks that uses the TCP/IP protocol to communicate.

One embodiment of the present invention comprises an Internet Protocol address or IP address. An Internet Protocol address is a unique number identifying a computer connected to the Internet. Internet Protocol version 4 (IPv4) addresses comprise 32 bits. Internet Protocol version 6 (IPv6) addresses comprise 128 bits.

One embodiment of the present invention comprises the IoT or Internet of Things. The IoT describes physical objects with sensors, processing ability, software and other technologies that connect and exchange data with other devices and systems over the Internet or other communications networks.

One embodiment of the present invention comprises a knowledge graph. A knowledge graph is a knowledge base that uses a graph-structured data model or topology to represent and operate on data. Knowledge graphs are often used to store interlinked descriptions of entities—objects, events, situations or abstract concepts—while also encoding the free-form semantics or relationships underlying these entities. Example knowledge graphs include VADALOG, FREEBASE, YAGO, and Resource Description Framework (RDF).

One embodiment of the present invention comprises a language model. A language model is a probability distribution over sequences of words. Given any sequence of words, a language model assigns a probability to the whole sequence. Language models are often used to respond in human language to a human language prompt. GPT-3 is an example language model.

One embodiment of the present invention comprises linear regression. Linear regression is a linear approach for modelling the relationship between a scalar response and one or more explanatory variables (also known as dependent and independent variables). The case of one explanatory variable is called simple linear regression; for more than one, the process is called multiple linear regression.

One embodiment of the present invention comprises low code or no code. Low code describes a software development process by which a computer program executes computer instructions according to non-code input from a user, typically inputted though a graphical user interface. Ideally, a no code program allows a user to design a computer program without knowing complicated code syntax.

One embodiment of the present invention comprises machine learning or ML. Machine learning algorithms build a model based on sample data, known as training data, in order to make predictions or decisions without being explicitly programmed to do so. Machine learning algorithms are used in a wide variety of applications, such as in medicine, email filtering, speech recognition, agriculture, and computer vision, where it is difficult or unfeasible to develop conventional algorithms to perform the needed tasks.

One embodiment of the present invention comprises a markup language. A markup language is a syntax for annotating a document in a way that is visually distinguishable from the content. Markup languages typically do not contain executable instructions. Example markup languages include HTML, LaTex, and Markdown.

One embodiment of the present invention comprises a meme. A meme comprises ARB wherein A and B represent ideas and R represents a relationship between them. In one embodiment, each element is stored as a numeric identifier. A meme is verbalized as a phrase, clause, sentence, or sentences.

One embodiment of the present invention comprises metadata. Metadata is data that provides information about other data, but not the content of the data itself. Metadata may describe the format, size, compression, authorship, ownership, copyright, legal, creation date, modification date, ordering, keywords, permissions, or other information about the primary data.

One embodiment of the present invention comprises a microprocessor. A microprocessor is a special case processor that converts a digital electric input signal into a digital electric output signal through a clock-driven integrated circuit comprising logic gates. Example commercial microprocessors include the Intel 4004, the Intel Pentium line, the IBM PowerPC line, the and the Motorola 68000.

One embodiment of the present invention comprises a mobile application or mobile app. A mobile application is an application that runs on a portable computer. Example mobile application operating systems include Apple iOS and Google Android.

One embodiment of the present invention comprises multimedia. Multimedia computer file formats include DOC, DOCX, FLV, HTML, OPD, PDF, PPT, and PPTX.

One embodiment of the present invention comprises multitenant. Multitenant describes a computer containing software programs from disparate tenants. A multitenant computer may have disparate companies as tenants. A multitenant computer may also have disparate groups/developers from a single company as tenants.

One embodiment of the present invention comprises a network protocol or protocol. A network protocol is a predefined signal syntax allowing two computers to communicate over a network. Protocols may be implemented by software, hardware, or both. Protocols are typically 'layered,' wherein more specific protocols are transmitted within more generic protocols. Example protocols include Address Resolution Protocol (ARP), Internetwork Packet Exchange (IPX), Transmission Control Protocol (TCP), Internet Protocol (IP), User Datagram Protocol (UDP), HyperText Transfer Protocol (HTTP), Secure Socket Layer (SSL), Transport Layer Security (TLS), File Transport Protocol (FTP), Secure File Transport Protocol (SFTP), Secure Shell (SSH), Telnet, Domain Name System (DNS). Internet Control Message Protocol (ICMP), NetBIOS, Remote Procedure Call (RPC), Internet Relay Chat (IRC), Network Time Protocol (NTP), Internet Message Access Protocol (IMAP), Post Office Protocol (POP), and Simple Mail Transfer Protocol (SMTP).

One embodiment of the present invention comprises a network router or router. A network router is a networking device that forwards data packets between computer networks. A router may itself be a computer.

One embodiment of the present invention comprises a network switch or switch or switching hub or bridging hub. A network switch is a networking device that connects other devices on a computer network by using packet switching to receive and forward data to the destination device.

One embodiment of the present invention comprises a neural network or NN or artificial neural network or ANN. A neural network is a computing system inspired by the biological neural network, typically comprising layers of neurons interconnected by synapses.

One embodiment of the present invention comprises a NFT or non-fungible token. A NFT is a unique and non-interchangeable unit of data stored on a blockchain. NFTs use a digital ledger to provide a public certificate of authenticity or proof of ownership. The lack of interchangeability (fungibility) distinguishes NFTs from blockchain cryptocurrencies, such as Bitcoin.

One embodiment of the present invention comprises NLP or natural language processing. NLP is the interdisciplinary subfield of linguistics, computer science, and artificial intelligence concerned with the interactions between computers and human language, in particular how to program computers to process and analyze large amounts of natural language data.

One embodiment of the present invention comprises open source. Open source describes a software program that is made freely available for possible modification and redistribution.

One embodiment of the present invention comprises an operating system or OS. An operating system is system software that manages computer hardware and software resources, and provides common services for computer programs. Example operating systems include Linux, Unix, Apple iOS, Apple MacOS, and Microsoft Windows.

One embodiment of the present invention comprises PPC or pay-per-click. PPC is an Internet advertising model used to drive traffic to websites, in which an advertiser pays a publisher (typically a search engine, website owner, or a network of websites) when the ad is clicked.

One embodiment of the present invention comprises a privacy policy. A privacy policy is a document describing how a service provider will handle user data. The document may include regulatory policies such as Family Educational Rights and Privacy Act (FERPA), Children's Online Privacy Protection Act (COPPA), and Health Insurance Portability and Accountability Act (HIPAA).

One embodiment of the present invention comprises a processor. A processor is a physical device that deterministically executes input signals into output signals. Signals are typically electric. Signals may be digital or analog.

One embodiment of the present invention comprises a program or computer program or piece of software or software program or computer application or application or app. A program is a distinct document of software. A program may reference and execute other programs. Example programs include Microsoft Word, WordPress, Apple iOS, and SQLite.

One embodiment of the present invention comprises a program specification or specification. A program specification is a data document describing the desired function of a computer program. A specification is typically processed by a code generator to output a computer program. Example specification encoding syntaxes include UML, XML, and JSON.

One embodiment of the present invention comprises a programming language. A programming language is a formal language comprising a set of strings that instruct a computer processor. There are a number of programming languages, each having a specific syntax to encode instructions. Programming languages are typically compiled to machine code for execution at the processor. Example programming languages include: ASP, BASIC, C, C#, C++, COBOL, Datalog, Erlang, Go, Haskell, Java, JavaScript, Lisp, Objective-C, Perl, Prolog, Python, PHP, Ruby, Rust, Scala, Solidity, and Vyper.

One embodiment of the present invention comprises a public license or public copyright license. A public license is a license by which a copyright holder as licensor can grant additional copyright permissions to any and all persons in the general public as licensees. By applying a public license to a work, provided that the licensees obey the terms and conditions of the license, copyright holders give permission for others to copy or change their work in ways that would otherwise infringe copyright law. Some public licenses, such as the GNU GPL and the CC BY-SA, are also considered free or open copyright licenses. However, other public licenses like the CC BY-NC are not open licenses, because they contain restrictions on commercial or other types of use.

One embodiment of the present invention comprises public-key cryptography or asymmetric cryptography. Public-key cryptography is the field of cryptographic systems that use pairs of related keys. Each key pair consists of a public key and a corresponding private key. Key pairs are generated with cryptographic algorithms based on mathematical problems termed one-way functions. Security of public-key cryptography depends on keeping the private key secret; the public key can be openly distributed without compromising security.

One embodiment of the present invention comprises a RDBMS or relational database management system. A RDBMS is a special case database management system using tuple principles.

One embodiment of the present invention comprises a recurrent neural network or RNN. A recurrent neural network is a class of artificial neural network (ANN) where connections between nodes can create a cycle, allowing output from some nodes to affect subsequent input to the same nodes.

One embodiment of the present invention comprises relational algebra. Relational algebra is a theory that uses algebraic structures for modeling data, and defining queries on it with well founded semantics. The theory was introduced by Edgar F. Codd.

One embodiment of the present invention comprises a REST or representational state transfer. A REST is an API design in which a client sends an HTTP request to a server which responds with structured data in XML, JSON, similar format.

One embodiment of the present invention comprises robots.txt. Robots.txt is a standard used by websites to indicate to visiting web crawlers and other web robots which portions of the website they are allowed to visit.

One embodiment of the present invention comprises a search engine. A search engine is a computer program designed to search documents, typically across the World Wide Web. Example search engines include Microsoft Bing, Google, and DuckDuckGo.

One embodiment of the present invention comprises a server or web server or network server. A server is a special case computer optimized for receiving requests and sending responses over a computer network.

One embodiment of the present invention comprises SHapley Additive explanations or SHAP. SHapley Additive explanations is a mathematical method to explain the predictions of machine learning models. It is based on the concepts of game theory and can be used to explain the predictions of any machine learning model by calculating the contribution of each feature to the prediction.

One embodiment of the present invention comprises social media. Social media comprises interactive technologies that facilitate the creation and sharing of information, ideas, interests, and other forms of expression through virtual communities and networks. Examples include Facebook, Twitter, and YouTube.

One embodiment of the present invention comprises a social network or social networking service. A social network is a computer program storing relationships between users, typically including features such as messaging, blogging, or picture uploading. Such services include Blogger, Chess.com, ClassDojo, Discord, Facebook, GitHub, Instagram, Medium, Pintrest, Quora, Reddit, Remind, Snapchat, Stack Overflow, Steam, Telegram, TikTok, Twitch, Twitter, WeChat, WhatsApp, Wikipedia, Yammer, YouTube, and similar.

One embodiment of the present invention comprises software or computer software or computer code or code. Software is instructions stored on a computer-readable storage medium to be executed by a computer processor.

One embodiment of the present invention comprises source ranking. Source ranking is the process of ranking the importance of various training source data in explaining the output of a neural network. For example, a neural network generates a song lyric and, when queried, displays a list of websites containing similar song lyrics as a source ranking.

One embodiment of the present invention comprises SPARQL. SPARQL is a query language for querying RDF databases.

One embodiment of the present invention comprises a spreadsheet. A spreadsheet is a document containing human-readable data structured in rows and columns.

One embodiment of the present invention comprises a spreadsheet program. A spreadsheet program is a special case program for manipulating spreadsheets.

One embodiment of the present invention comprises SQL or Simple Query Language. SQL is a domain-specific computer language for manipulating data in a relational database management system.

One embodiment of the present invention comprises a tenant. A tenant is a software developer whose program is running on a computer controlled by another party. Typically, tenants pay to rent server computing resources from cloud providers. Alternatively, a device owner may install a tenant's software on their device for the benefits of controlling and using the software, such as on a desktop, laptop, or smart phone.

One embodiment of the present invention comprises a TOS or terms of service. A TOS is a legal agreement between a user and a service provider.

One embodiment of the present invention comprises a training source. A training source is a data source which is used in the training of a neural network. Training sources can be in a number of mediums including text, image, video, audio, or other multimedia. A common type of training source is a website.

One embodiment of the present invention comprises a transformer. A transformer is a deep learning model that adopts the mechanism of self-attention, differentially weighting the significance of each part of the input data. It is used primarily in the fields of natural language processing and computer vision.

One embodiment of the present invention comprises a tuple. A tuple is a data structure comprising a list of elements, including enumerated arrays and associative arrays.

One embodiment of the present invention comprises an URL or uniform resource locator or web address. An URL is a reference to a web resource that specifies its location on a computer network and a mechanism for retrieving it. A typical URL could have the form http://www.example.com/index.html, which indicates a protocol (http), a hostname (www.example.com), and a file name (index.html).

One embodiment of the present invention comprises a user. A user is an entity initiating an execution on a computer. Typically, a user is a human interacting with an input device. Alternatively, a user is a second computer programmed to interact with the former computer.

One embodiment of the present invention comprises video. Video computer file formats include 3GP, AVI, FLV, GIF, MOV, MP2, MP4, WEBM, WMV, and similar.

One embodiment of the present invention comprises a virtual machine. A virtual machine is a virtualization/emulation of a computer system. Virtual machines are based on computer architectures and provide functionality of a physical computer. Their implementations may involve specialized hardware, software, or a combination.

One embodiment of the present invention comprises virtual reality or VR. Virtual reality is a simulated experience that employs pose tracking and 3D near-eye displays to give the user an immersive feel of a virtual world. Applications of virtual reality include entertainment (particularly video games), education (such as medical or military training) and business (such as virtual meetings). Other distinct types of VR-style technology include augmented reality and mixed reality, sometimes referred to as extended reality or XR, although definitions are currently changing due to the nascence of the industry.

One embodiment of the present invention comprises a web browser or browser or Internet browser. A web browser is a program for browsing the World Wide Web. A typically browser function is to download and render a webpage comprising HTML, JavaScript, and/or CSS. Example web browsers include Microsoft Internet Explorer, Microsoft Edge, Google Chrome, Apple Safari, and Mozilla Firefox.

One embodiment of the present invention comprises a webhost or web host. A webhost is a special case cloud provider specializing in serving documents on the World Wide Web.

One embodiment of the present invention comprises a webpage or web page. A webpage is an HTML document on the World Wide Web.

One embodiment of the present invention comprises a website or web site. A website is a group of related web pages controlled by one legal person.

One embodiment of the present invention comprises a word processor. A word processor is a program for humans to compose human-readable documents.

One embodiment of the present invention comprises the World Wide Web or WWW or web. The World Wide Web is an information network of hyperlinked documents transmitted from web servers to client web browsers over the Internet using the HTTP protocol invented by Sir Timothy Berners-Lee in 1989 at CERN. Transmitted documents typically comprise HTML, CSS, and JavaScript.

One embodiment of the present invention comprises zero-knowledge proof or ZK proof. Zero-knowledge proof is the process by which one party (the prover) can prove to another party (the verifier) that a given statement is true while the prover avoids conveying any additional information apart from the fact that the statement is indeed true. A non-interactive zero-knowledge proof requires no interaction between the prover and verifier. These cryptographic techniques are used to bundle transactions on blockchains. Examples include NIZK, zk-SNARK, and zk-STARK.

I claim as my invention the following:

1. A method for a computing device to dynamically generate tuple triplets from stored tuple triplets, the method comprising:
   receiving, at a network interface, a first element identifier;
   reading, from a non-transitory computer-readable storage medium, a first set of computer instructions comprising a rule table that associates an ordered pair comprising a first relation identifier and a second relation identifier, with a third relation identifier;
   reading, from a non-transitory computer-readable storage medium, a first plurality of triplets, each triplet comprising at least three identifiers, wherein at least one identifier in each triplet equals the first element identifier, wherein at least one identifier in each triplet equals the first relation identifier, and wherein at least one identifier in each triplet is a distinct identifier which does not equal the first element identifier or the first relation identifier;
   reading, from a non-transitory computer-readable storage medium, according to the first set of computer instructions, a second plurality of triplets, each triplet comprising at least three identifiers, wherein at least one identifier in each triplet equals the second relation identifier, wherein at least one identifier in each triplet equals a distinct identifier from the first plurality of triplets, the distinct identifier serving as an element identifier in the second plurality, and wherein at least one identifier in each triplet is a distinct identifier which does not equal the distinct identifier from the first plurality of triplets or the second relation identifier;
   forming, at a processor, according to the first set of computer instructions, a third plurality of triplets in a distinct non-transitory volatile computer-readable storage medium, each triplet comprising the first element identifier, the third relation identifier, and a distinct identifier from the second plurality of triplets; and
   outputting, at a network interface, the third plurality of triplets.

2. The method of claim 1, wherein the first element identifier is omitted from the third plurality of triplets.

3. A method for storing retrieval-optimized related data on a computing device, the method comprising:
   receiving, at a network interface, a first identifier, a second identifier, and a third identifier;
   reading, from a non-transitory computer-readable storage medium, a first set of computer instructions for calculating a location on a non-transitory computer-readable storage medium according to an inputted identifier;
   calculating, at a processor, according to the first set of computer instructions and the first identifier, a first location on a non-transitory computer-readable storage medium;
   storing, at the first location on a non-transitory computer-readable storage medium, the second identifier and the third identifier;
   calculating, at a processor, according to the first set of computer instructions and the second identifier, a second location on a non-transitory computer-readable storage medium;
   reading, from a non-transitory computer-readable storage medium, a second set of computer instructions comprising a deterministic function for calculating a modified identifier according to an inputted identifier, wherein the modified identifier is distinct from the inputted identifier;
   calculating, at a processor, according to the second set of computer instructions and the third identifier, a modified third identifier; and
   storing, at the second location on a non-transitory computer-readable storage medium, the first identifier and the modified third identifier.

4. The method of claim 3, wherein the second set of computer instructions comprises concatenating at least one bit to the inputted third identifier.

5. The method of claim 3, wherein the second set of computer instructions comprises flipping at least one bit on the inputted third identifier.

6. The method of claim 3, wherein the second set of computer instructions comprises a constant number added to, subtracted from, multiplied by, or dividing the inputted third identifier.

7. The method of claim 3, wherein the first location and the second location are on two separate non-transitory computer-readable storage mediums.

8. A method for retrieving retrieval-optimized related data from a computing device, the method comprising:

receiving, at a network interface, a first identifier;

reading, from a non-transitory computer-readable storage medium, a first set of computer instructions comprising a deterministic function for calculating a location on a non-transitory computer-readable storage medium according to an inputted identifier; calculating, at a processor, according to the first set of computer instructions and the first identifier, a first location on a non-transitory computer-readable storage medium;

retrieving, from the first location on a non-transitory computer-readable storage medium, a plurality of entities, each entity comprising a second identifier and a third identifier, wherein the second identifier may differ for each entity, and wherein the third identifier may differ for each entity, and wherein the second identifier and the third identifier pair is unique for each entity;

reading, from a non-transitory computer-readable storage medium, a second set of computer instructions for calculating a modified identifier according to an inputted identifier, wherein the modified identifier is distinct from the inputted identifier;

calculating, at a processor, according to the second set of computer instructions and at least one third identifier from the plurality of entities, at least one modified third identifier; and outputting, at a network interface, the plurality of entities comprising at least one modified third identifier.

* * * * *